United States Patent [19]

Nakamura

[11] Patent Number: 5,768,608
[45] Date of Patent: Jun. 16, 1998

[54] DATA PROCESSING APPARATUS AND METHOD FOR MAKING SAME

[75] Inventor: Akiyoshi Nakamura, Suwa, Japan

[73] Assignee: Seiko Epson Corporation, Tokyo, Japan

[21] Appl. No.: 561,760

[22] Filed: Nov. 22, 1995

[30] Foreign Application Priority Data

Nov. 22, 1994 [JP] Japan .................... 6-312540

[51] Int. Cl.$^6$ .................................... G06F 13/40
[52] U.S. Cl. ............... 395/800; 395/308; 364/240.2; 364/240.7; 364/DIG. 1
[58] Field of Search ..................... 395/800, 308; 364/240.2, 240.7, DIG. 1

[56] References Cited

U.S. PATENT DOCUMENTS

| | | | |
|---|---|---|---|
| 5,280,598 | 1/1994 | Osaki et al. ............... | 395/307 |
| 5,301,281 | 4/1994 | Kennedy ..................... | 395/307 |
| 5,301,296 | 4/1994 | Mohri et al. ................ | 395/455 |
| 5,349,693 | 9/1994 | Matsushita ................. | 395/800 |

Primary Examiner—John E. Harrity
Attorney, Agent, or Firm—Loeb & Loeb LLP

[57] ABSTRACT

A data processing apparatus capable of receiving a CPU of different data bus widths is disclosed. Terminals for the lower 32 bits of a 64-bit data bus and terminals for upper 32 bits of the 64-bit data bus are provided opposing to one another at a connector. Also, terminals for the lower 3 bits of a byte enable signal and terminals for the upper 4 bits of the byte enable signal are disposed opposing one another. When a first CPU module having a 32-bit CPU is installed, a bus connector board is coupled to the connector to couple the corresponding terminals of the lower 32 bits and the upper 32 bits, and the corresponding terminals of the lower 3 bits and the upper 4 bits of the byte enable signal.

7 Claims, 29 Drawing Sheets

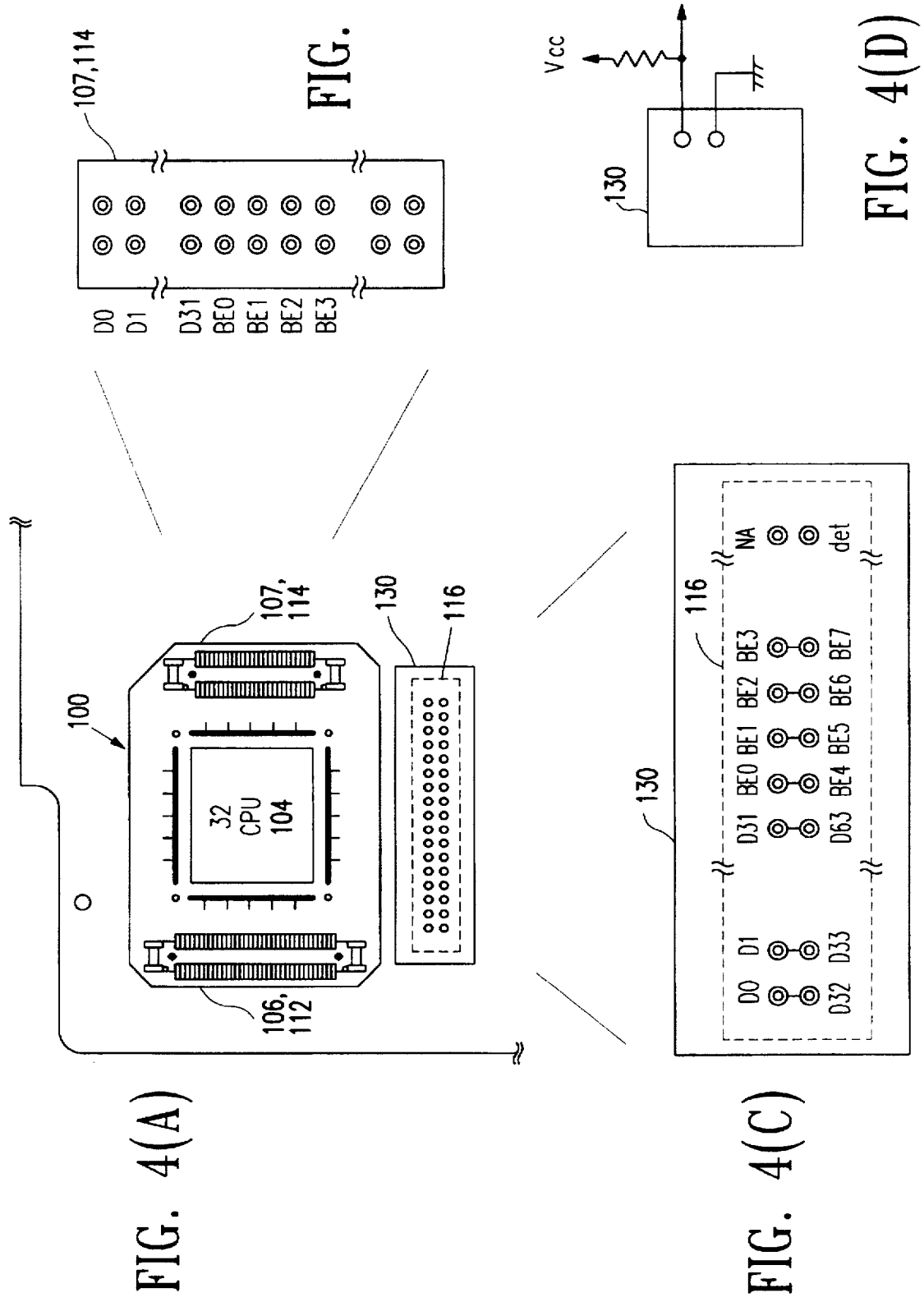

(READ CYCLE WITHOUT CACHE)
FIG. 13(a) ADS 
FIG. 13(b) A31~3 
FIG. 13(c) KEN H
FIG. 13(d) BE0~7  11111110
FIG. 13(e) ADS' 
FIG. 13(f) A2 
FIG. 13(g) BE0~3'  1110
FIG. 13(h) BRDY' 
FIG. 13(i) DATA 

(BURST READ CYCLE WITH CACHE)

FIG. 13(j)  ADS
FIG. 13(k)  A31~3
FIG. 13(l)  KEN
FIG. 13(m) BE0~7    11111110
FIG. 13(n)  ADS'
FIG. 13(o)  A2
FIG. 13(p)  BE0~3'  0000
FIG. 13(q)  BRDY'       1    2    3    4
FIG. 13(r)  DATA   32 BITS    1    2    3    4
                              (64 BITS)
            BURST TRANSFER    1    2    3    4

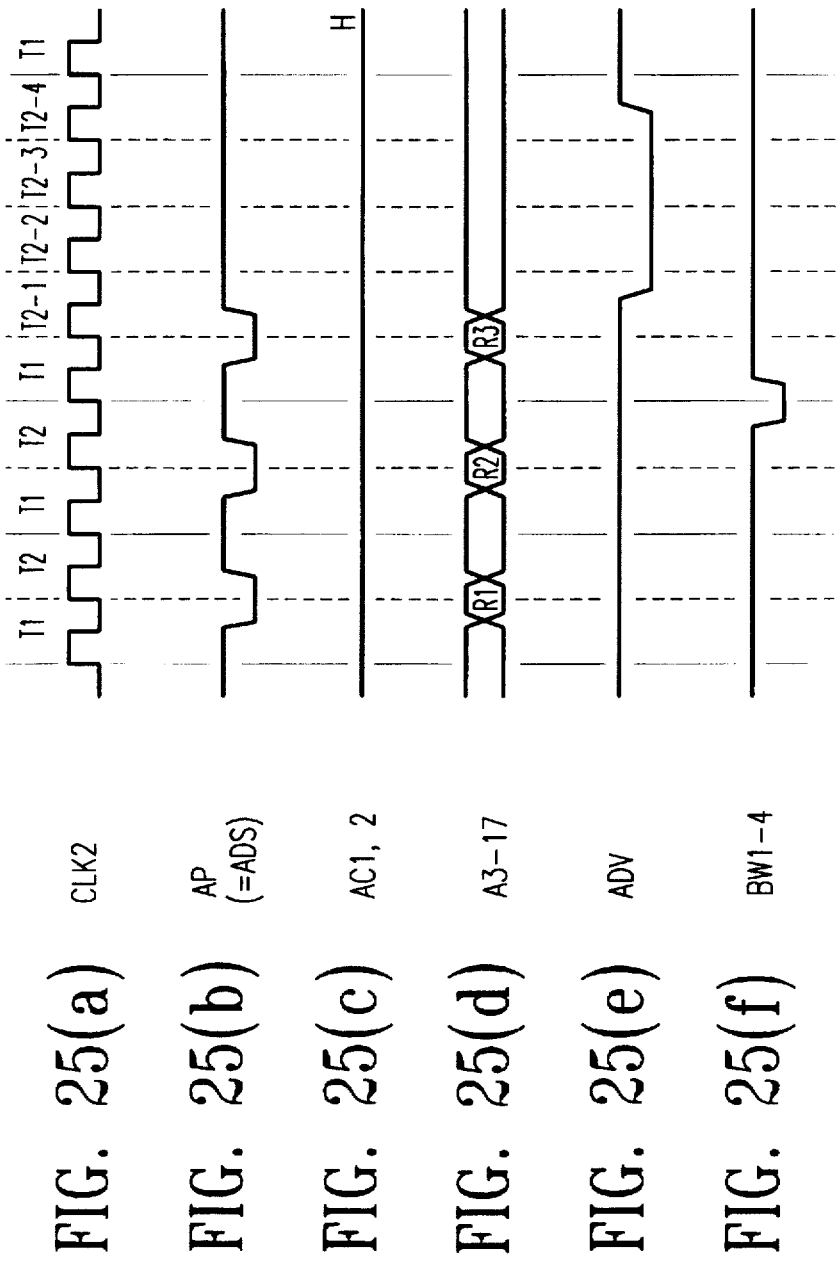

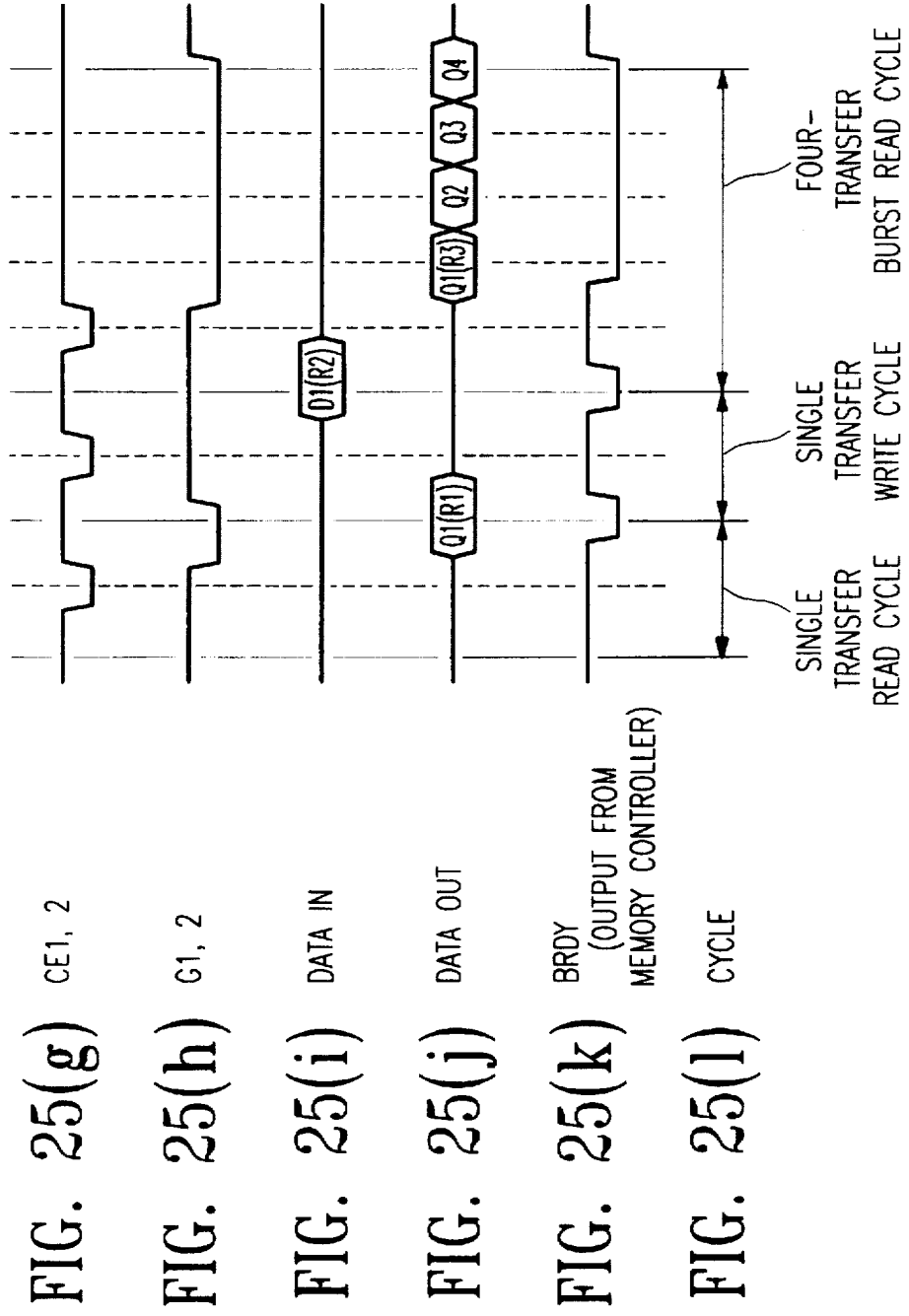

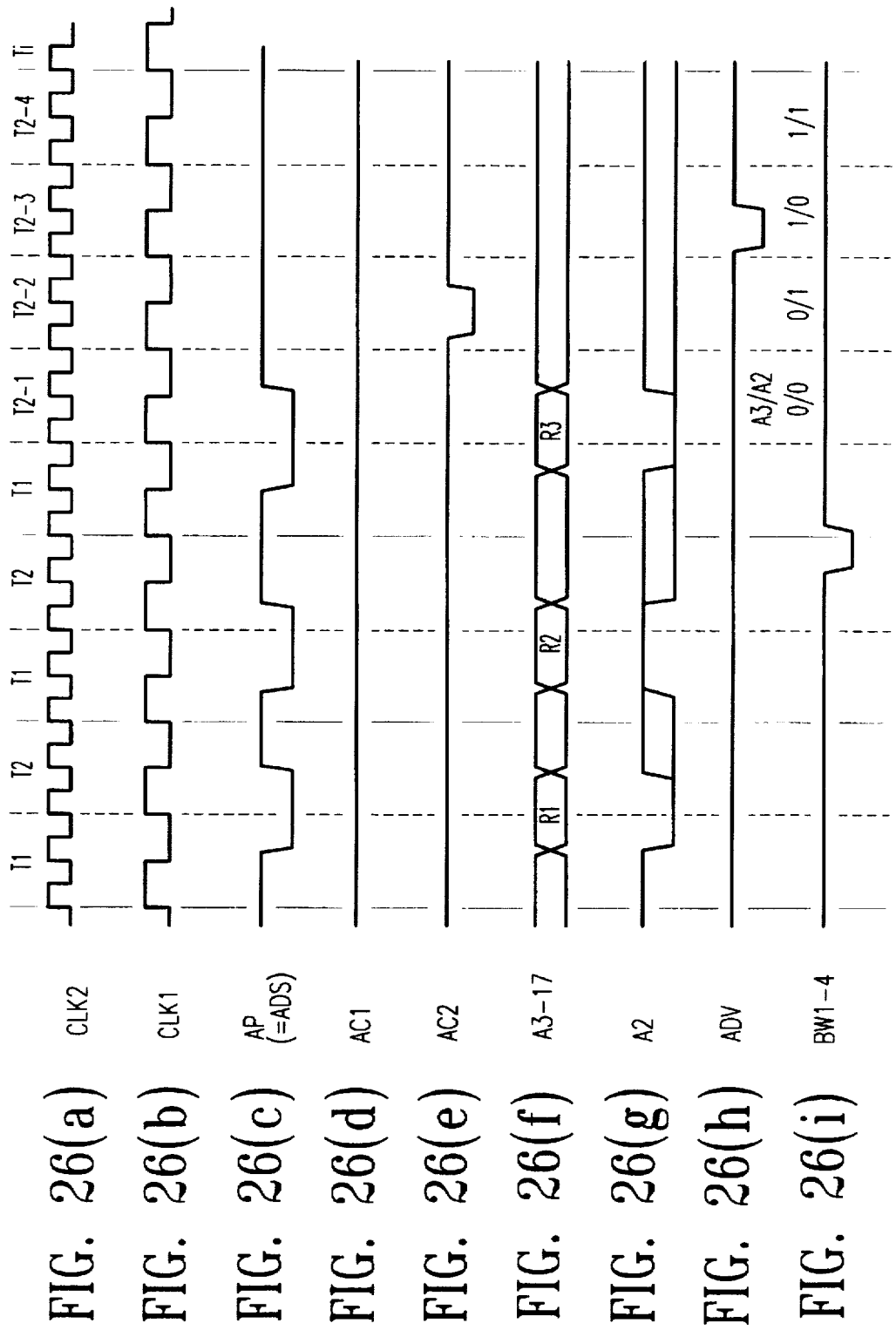

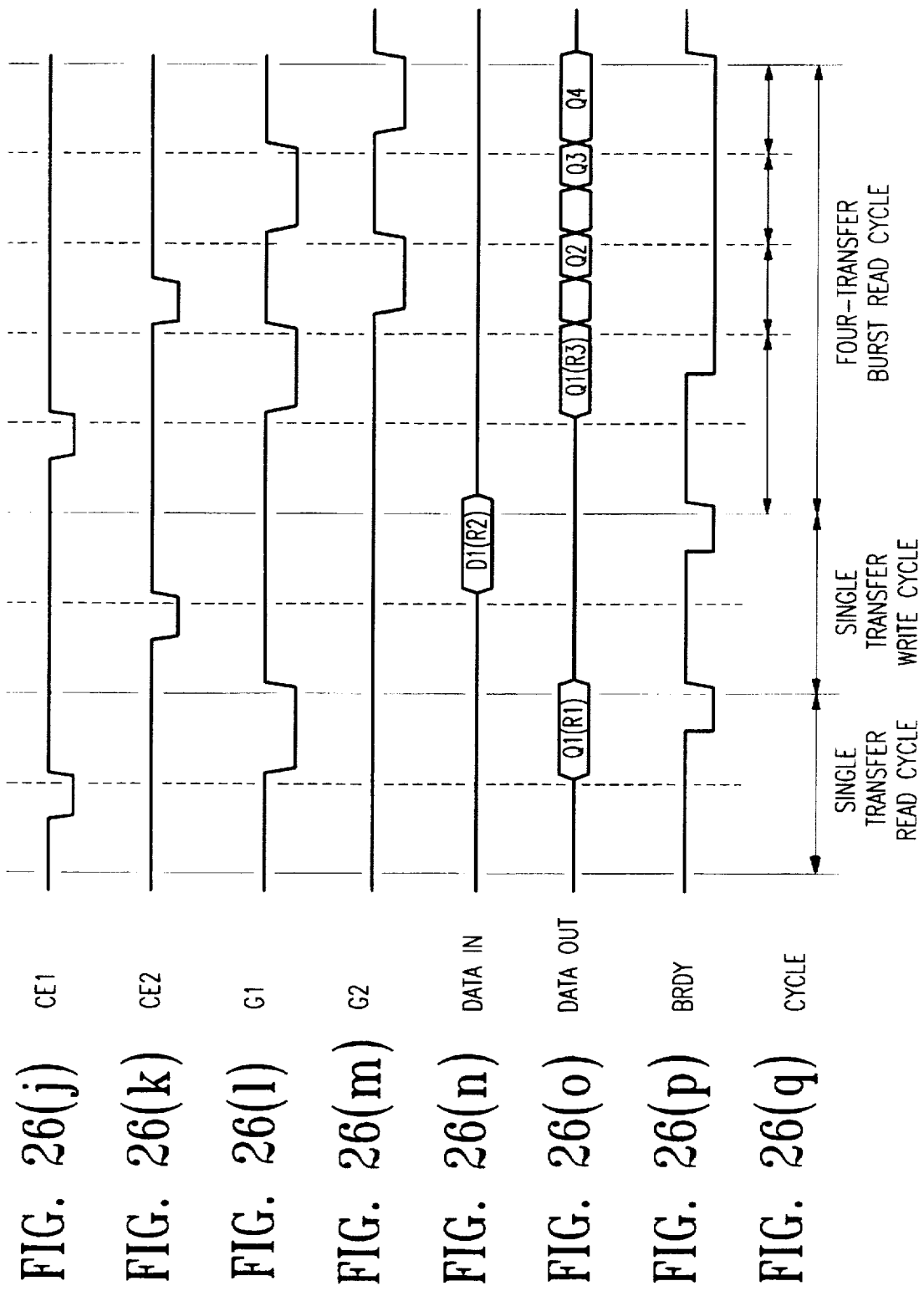

DATA PROCESSING APPARATUS AND METHOD FOR MAKING SAME

BACKGROUND OF THE INVENTION

1. Field of the Invention

The present invention relates to a data processing apparatus in which a plurality of CPU modules having different data bus widths are interchangeable, and a method of making the same.

2. Prior Art

In recent years, the development of microprocessors for a CPU that is used for data processing apparatus has been pursued at an accelerated rate. As a result, microprocessors having higher performances have been successively released in the market. There are data processing apparatuses that are capable of replacing a currently installed CPU by a new CPU with a higher performance. In such data processing apparatuses, an old CPU can be replaced with a CPU operating at a greater clock frequency so that the processing speed is increased by the CPU replacement. Not only microprocessors having different clock frequencies, but also microprocessors with a greater bus width that are operable at a greater speed and have a higher performance have been successively developed.

However, when a new CPU having a different data bus is selected and installed, there are instances in which the bus width of the new CPU and the bus width of the CPU bus within the computer are different from one another. As a result, there are problems in which the CPU cannot appropriately perform data transfer. Therefore, there has not been a data processing apparatus in which CPUs having different data bus widths can be selected and installed for operation.

SUMMARY

It is an object of a preferred embodiment of the present invention to provide a data processing apparatus and a method of making thereof in which CPUs having different data bus widths can be selected and installed for operation.

To achieve this object, there is provided a data processing apparatus in which a first CPU module having a first data bus of a first bus width is replaceable with a second CPU module having a second data bus of a second bus width that is twice as wide as the first bus width. The data processing apparatus in accordance with a preferred embodiment includes a processor data bus including a first bus section and a second bus section, each having a bus width equal to the first bus width; a first group of terminals coupled to the first bus section of the processor data bus, the first group of terminals being capable of coupling to the first data bus when the first CPU module is installed; and a second group of terminals coupled to the second bus section of the processor data bus, the second group of terminals including terminals being capable of coupling to the first group of terminals when the first CPU module is installed, and being capable of coupling to the second data bus together with the first group of terminals when the second CPU module is installed.

It should be noted that the terms "CPU module" used throughout the present specification are not limited to a module having a CPU chip mounted on a printed circuit board, but also includes a single CPU chip itself. When the first CPU module is installed, the first data bus is coupled to the first group of terminals, and corresponding terminals of the first group of terminals and the second group of terminals are coupled. On the other hand, when a second CPU module is installed, the second data bus is coupled to the first and the second groups of terminals. Therefore, the first CPU module and the second CPU module having different data bus widths can be selected and installed for operation.

A data processing apparatus of another embodiment further includes the first CPU module having the first data bus being removably coupled to the first group of terminals, and a removable bus connector device for coupling corresponding terminals of the first group of terminals and the second group of terminals.

When the first CPU module is installed, the corresponding terminals of the first group of terminals and the second group of terminals are coupled by means of the bus connector device. As a result, the same data is provided to the first bus section and the second bus section of the processor data bus. Accordingly, this simplifies the steps of transferring data on the processor data bus to the other circuits within a data processing apparatus that is equipped with the first CPU module.

In accordance with a data processing apparatus of another embodiment, the corresponding terminals of the first group of terminals and the second group of terminals are disposed opposing each other, and the bus connector device includes a plurality of conductor sections for coupling the opposed corresponding terminals of the first group of terminals and the second group of terminals. In accordance with this structure, the terminals of the first group of terminals and the associated terminals of the second group of terminals are readily coupled.

A data processing apparatus of another embodiment includes a first group of byte enable terminals for transferring a first byte enable signal that indicates which one of bytes on the first bus section of the processor data bus is enabled, and a second group of byte enable terminals for transferring a second byte enable signal that indicates which one of bytes on the second bus section of the processor data bus is enabled. The bus connector device includes a device for coupling corresponding terminals of the first group of byte enable terminals and the second group of byte enable terminals.

When the first CPU module is installed for operation, the same data is provided to the first bus section and the second bus section of the processor data bus. Furthermore, in this structure, the first byte enable signal and the second byte enable signal become the same signal. As a result, this further simplifies the steps of transferring data on the processor data bus to the other circuits within a data processing apparatus that is equipped with the first CPU module.

A data processing apparatus of another embodiment comprises the second CPU module having the second data bus being removably coupled to the first group of terminals and the second group of terminals. By removably coupling the first group of terminals and the second group of terminals to the second data bus, the second CPU module is readily installed.

A data processing apparatus as defined in another embodiment includes a first external cache circuit coupled to the first bus section of the processor data bus, a second external cache circuit coupled to the second bus section of the processor data bus, a module determination signal generation device for generating a module determination signal that indicates which one of the first CPU module and the second CPU module is installed, and an external cache control device responsive to the module determination signal for supplying to the first and the second external caches a signal for executing a cache operation that is appropriate to an installed CPU module.

In response to the module determination signal, the external cache control device supplies to the first and the second external caches a signal for executing a cache operation that is appropriate to an installed CPU module. As a result, the first cache circuit and the second cache circuit are effectively utilized whichever the CPU modules are installed.

In accordance with a data processing apparatus of another embodiment, the external cache control device includes a device responsive to an address provided by the installed CPU that selects one of the first external cache circuit and the second external cache circuit and generates a signal for executing a data input-output operation when the first CPU module is installed, and selects both the first external cache circuit and the second external cache circuit and generates a signal for executing a data input-output operation when the second CPU module is installed.

The first external cache circuit is coupled to the first bus section of the processor data bus, and the second external cache circuit is coupled to the second bus section of the processor data bus. Accordingly, when the first CPU module is installed, one of the first external cache circuit and the second external cache circuit is selected in response to an address provided by the CPU to perform the data input-output operation. When the second CPU module is installed, both the first external cache and the second external cache are simultaneously selected to perform the data input-output operation. As a result, both the first external cache circuit and the second external cache circuit are effectively utilized whichever the CPU modules are installed.

In accordance with a data processing apparatus of another embodiment, the module determination signal generation device includes a module determination terminal that changes a level of the module determination signal in response to the state of connection of a connector including the second group of terminals. As a result, an operation appropriate to the installed CPU module is performed in response to the state of connection of the connector.

There is provided a method of making a data processing apparatus in which a first CPU module having a first data bus of a first bus width is replaceable with a second CPU module having a second data bus of a second bus width that is twice as wide as the first bus width. The method comprises (a) providing a processor data bus including a first bus section and a second bus section, each having a bus width equal to the first bus width, a first group of terminals coupled to the first bus section of the processor data bus, and a second group of terminals coupled to the second bus section of the processor data bus; (b) installing a CPU including one of steps of removably coupling the first group of terminals to the first data bus when the first CPU module is installed, and removably coupling the first group of terminals and the second group of terminals to the second data bus when the second CPU module is installed; and (c) coupling corresponding terminals of the first group of terminals and the second group of terminals when the first CPU module is installed.

When the first CPU module is installed for operation, the first data bus is coupled to the first group of terminals, and the corresponding terminals of the first group of terminals and the second group of terminals are coupled to one another. When the second CPU module is installed for operation, the second data bus is coupled to the first group and the second group of terminals. Therefore, the first and the second CPU modules having different data bus widths can be selected and installed for operation.

In accordance with another method of making a data processing apparatus, the step (a) includes steps of providing a first group of byte enable terminals for transferring a first byte enable signal that indicates which one of bytes on the first bus section of the processor data bus is enabled and a second group of byte enable terminals for transferring a second byte enable signal that indicates which one of bytes on the second bus section of the processor data bus is enabled; and the step (c) includes a step of coupling corresponding terminals of the first group of byte enable terminals and the second group of byte enable terminals.

As a result, the first byte enable signal and the second byte enable signal become the same signal. This further simplifies the steps of transferring data on the processor data bus to the other circuits within a data processing apparatus that is equipped with the first CPU module.

In accordance with another method of making a data processing apparatus, the step (a) includes steps of providing a first external cache circuit coupled to the first bus section of the processor data bus, a second external cache circuit coupled to the second bus section of the processor data bus, and a module determination signal generation device for generating a module determination signal that indicates which one of the first CPU module and the second CPU module is installed, and further includes a step (d) of executing a cache operation that is appropriate to an installed CPU module in response to the module determination signal.

As a result, the first external cache circuit and the second external cache circuit are effectively utilized whichever the CPU modules are installed.

BRIEF DESCRIPTION OF THE FIGURES

FIGS. 4a–4d show a plan view of a state in which a first CPU module 100 is installed.

FIG. 13 shows a timing chart of an operation of a lower address conversion circuit 606 in response to a cache enable signal KEN.

FIG. 25 shows a timing chart of the operation of a secondary cache when a 64-bit CPU 124 is installed.

FIG. 26 shows a timing chart of the operation of a secondary cache when a 32-bit CPU 104 is installed.

DETAILED DESCRIPTION

A. Method of Installing CPU Module

Figure 1:
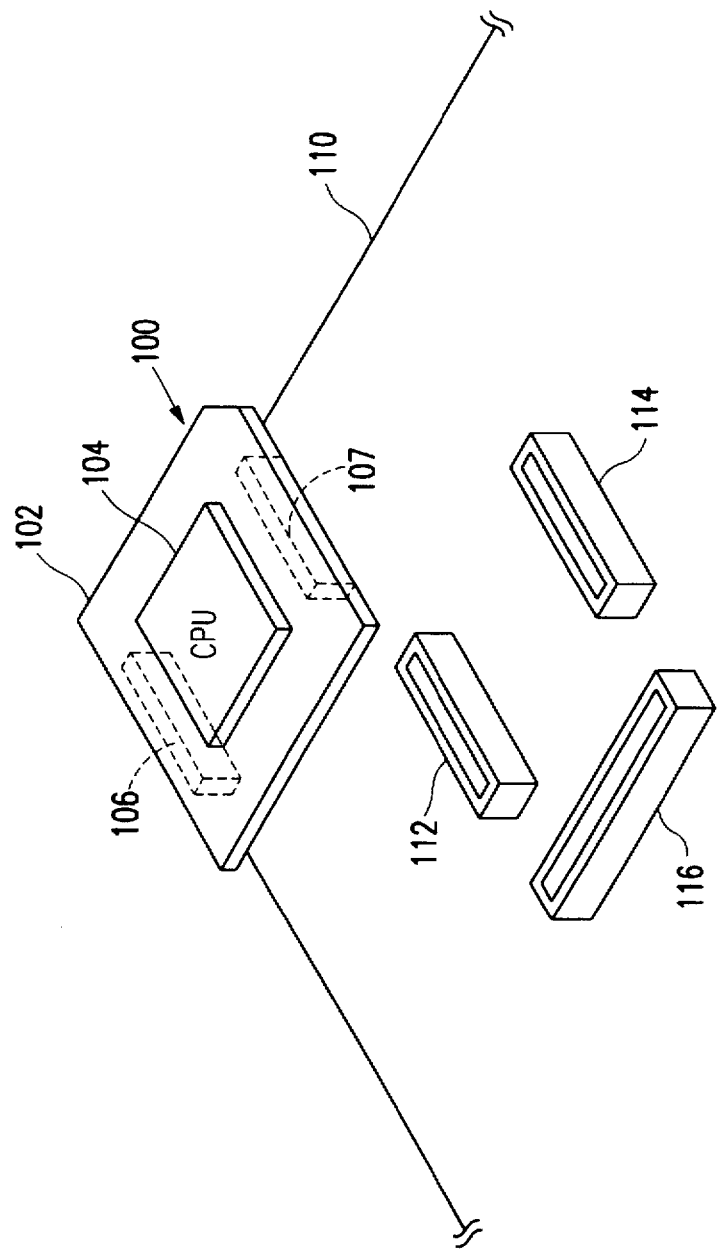
FIG. 1 shows a perspective view of a first CPU module that is installed in a personal computer in accordance with an embodiment of the present invention.

FIG. 1 shows a perspective view of a first CPU module to be mounted to a personal computer in accordance with an embodiment of the present invention. A first CPU module 100 has a printed circuit board 102, a first CPU 104 provided on the upper surface of the printed circuit board 102, and two connectors 106 and 107 provided on the lower surface of the printed circuit board 102. The first CPU 104 has a 32-bit data bus width. A system board 110, a printed circuit board that installs primary circuits of the personal computer, has connectors 112 and 114 that engage the two connectors 106 and 107 of the first CPU module 100, respectively, and a connector 116 that engages a second CPU module which is described later.

Figure 2:
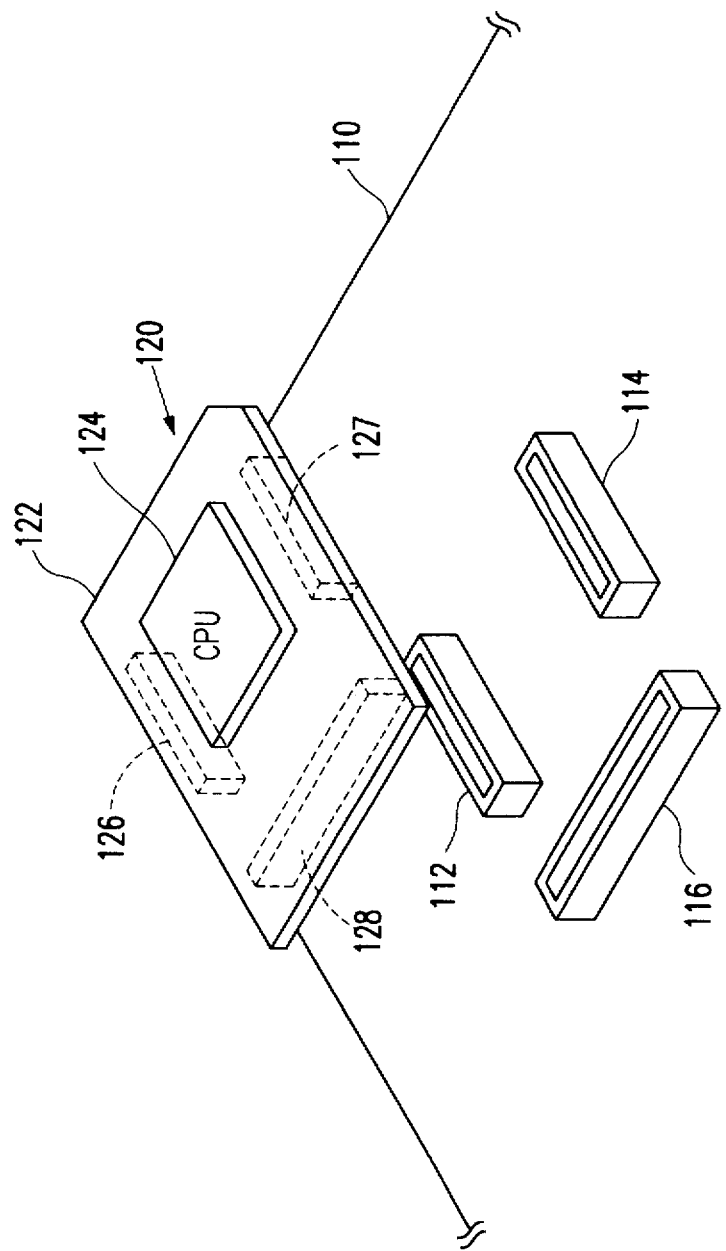
FIG. 2 shows a perspective view of a second CPU module.

FIG. 2 shows a perspective view of a second CPU module. A second CPU module 120 has a printed circuit board 122, a second CPU 124 having a 64-bit data bus width, three connectors 126, 127 and 128 provided on the lower surface of the printed circuit board 122. The connectors 126, 127 and 128 engage the three connectors 112, 114 and 116 of the system board 110, respectively.

As shown in FIGS. 1 and 2, the first CPU module 100 is removably coupled to the connectors 112 and 114 provided on the system board 110, and the second CPU module 120 are removably coupled to the connectors 112, 114 and 116. Therefore, a user can exchange the first CPU module 100 with the second CPU module 120 at any time according to the requirements.

Preferably, the second CPU 124 is capable of running software that are executable on the first CPU 104. Namely, it should preferably be a software-compatible with the first CPU 104. The first CPU 104 may include, for example, i486 (Trademark of Intel), and the second CPU 124 may include, for example, Pentium (Trademark of Intel).

Figure 3A:
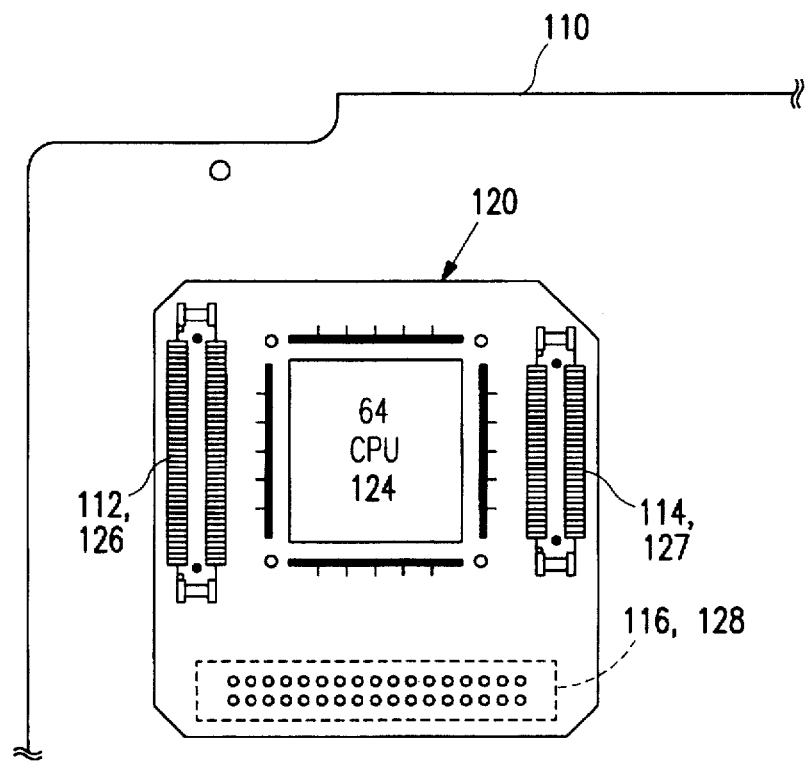
FIGS. 3a–3c show a plan view of a state in which a second CPU module 120 is installed.
Figure 3B:
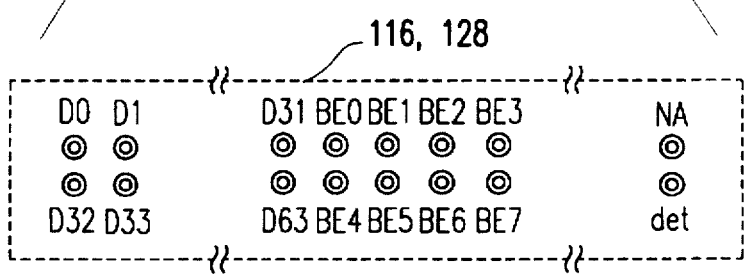
Figure 3C:
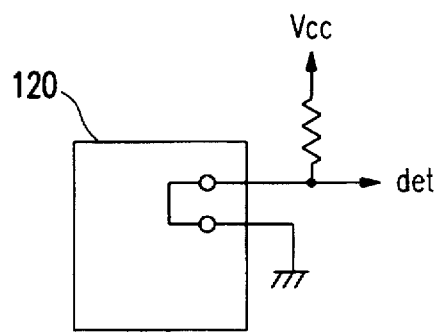

FIGS. 3a–4c show a plan view illustrating a status in which the second CPU module 120 is installed. FIG. 3 (B) is a view to be used for explaining an arrangement of terminals of the connector 116. The connector 116 includes terminals required for signals of the second CPU 124, namely, terminals D0–D63 for a 64-bit data bus and terminals BE0–BE7 for an 8-bit byte enable signal. Also, a module determination terminal det is provided for determining the kind of a CPU module that is installed. The byte enable signal BE0–BE7 is a signal that indicates an effective byte among 8-byte data on the 64-bit data bus. For example, when the byte enable signal at BE0 is at "L" level, the least significant one byte among the eight bytes is effective. When the byte enable signal at BE7 is at level "L" level, the most significant one byte of the eight bytes is effective. When all the eight bytes are effective, the byte enable signal at BE0–BE7 are at "L" level.

At the connector 116, terminals for the lower 32 bits D0–D32 of the data bus are disposed opposing terminals for the upper 32 bits D32–D63 of the data bus. Also, terminals for the lower 4 bits BE0–BE3 of the write enable signal are disposed opposing terminals for the upper 4 bits BE4–BE7.

It should be noted that terminals and signals inputted in or outputted from the terminals are called by the same reference numerals throughout the present application.

FIG. 4 (A) shows a plan view illustrating a state in which the first CPU module 100 is installed. When the first CPU module 100 is installed, a bus connector board 130 is inserted in the connector 116.

FIG. 4 (B) shows an arrangement of terminals of the connector 107 and 114. The connectors 107 and 114 include terminals for 32-bit data bus D0–D31 required for the first CPU 104 and 4-bit byte enable signals BE0–BE3.

When the first CPU module is installed, the upper 32 bits D32–D63 and the byte enable signal at BE4–BE7 are not required. As shown in FIG. 4 (C), the bus connector board 130 connects the terminals of the lower 32 bits D0–D31 of the data bus to the associated terminals of the upper 32 bits D32–D63, and also connects the terminals of the lower 4 bits BE0–BE3 and the associated terminals of the upper bits of BE4–BE7.

Figure 5:
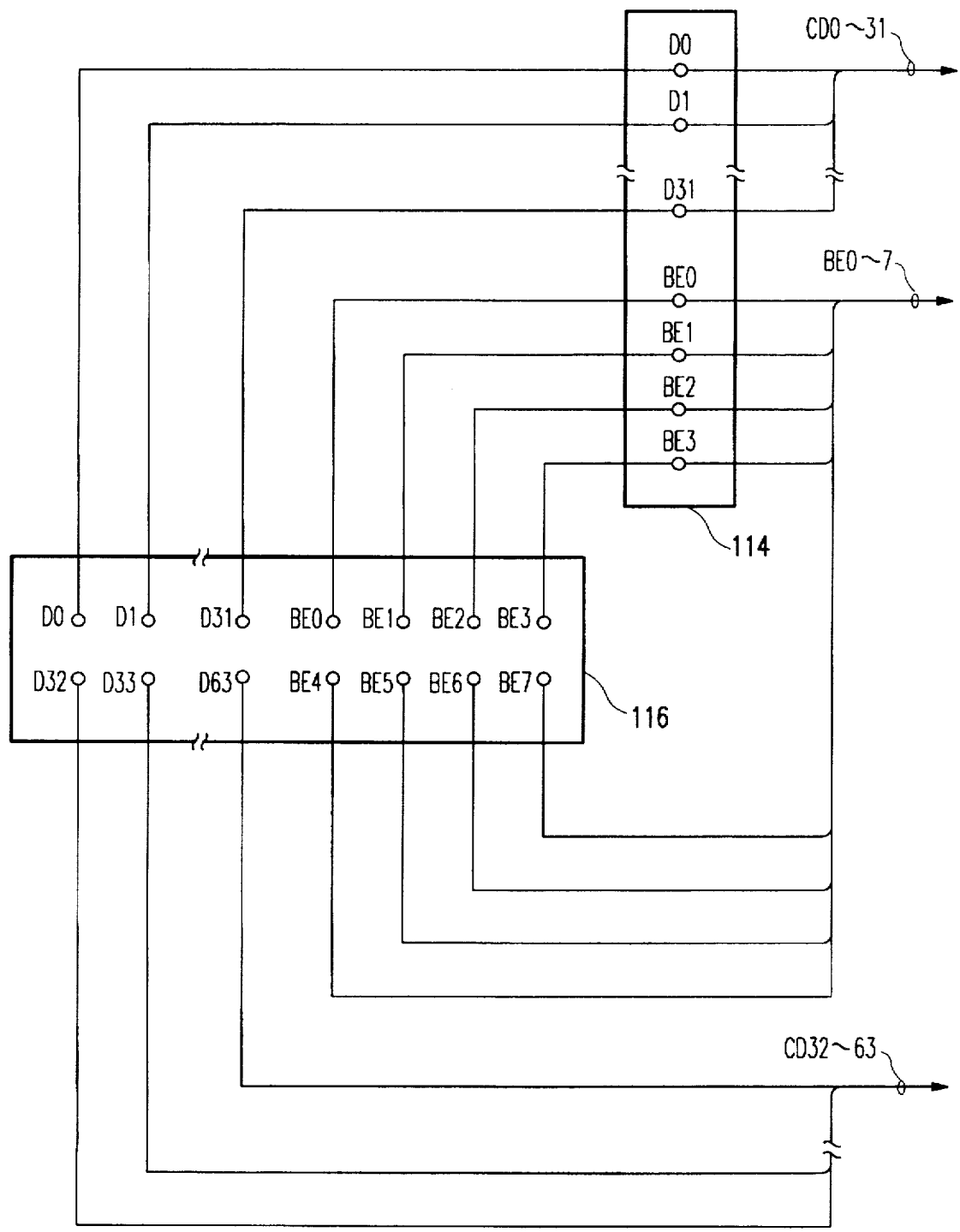
FIG. 5 is a view used to describe a connection status of connectors 116, 116 on a system board 110.

FIG. 5 shows a wiring configuration of the connectors 114 and 116 on the system board 110. The terminals of the lower 32 bits D0–D31 of the data bus at the connector 114 are coupled to the terminals of the lower 32 bits D0–D31 at the connector 116, and coupled to terminals of the lower 32 bits CD0–CD31 of the processor data bus provided on the system board 110. The terminals of the upper 32 bits D32–D63 of the data bus at the connector 116 are coupled to the terminals of the upper 32 bits CD32–CD63 of the processor data bus provided on the system board 110. In a similar manner, the terminals of the lower 4 bits BE0–BE3 of the write enable signal at the connector 114 are coupled to the terminals of the lower 4 bits BE0–BE3 at the connector 116, and coupled, together with the terminals of the upper 4 bits BE4–BE7, to a bus for the 8-bit byte enable signal provided on the system board 110.

When the first CPU module 100 is installed, the terminals of D0–D31, BE0–BE3 of the connector 116 may be used to couple the CPU 104 to the bus of the system board 110. As a result, the terminals D0–D31, BE0–BE3 of the connector 114 can be omitted.

Figure 6:
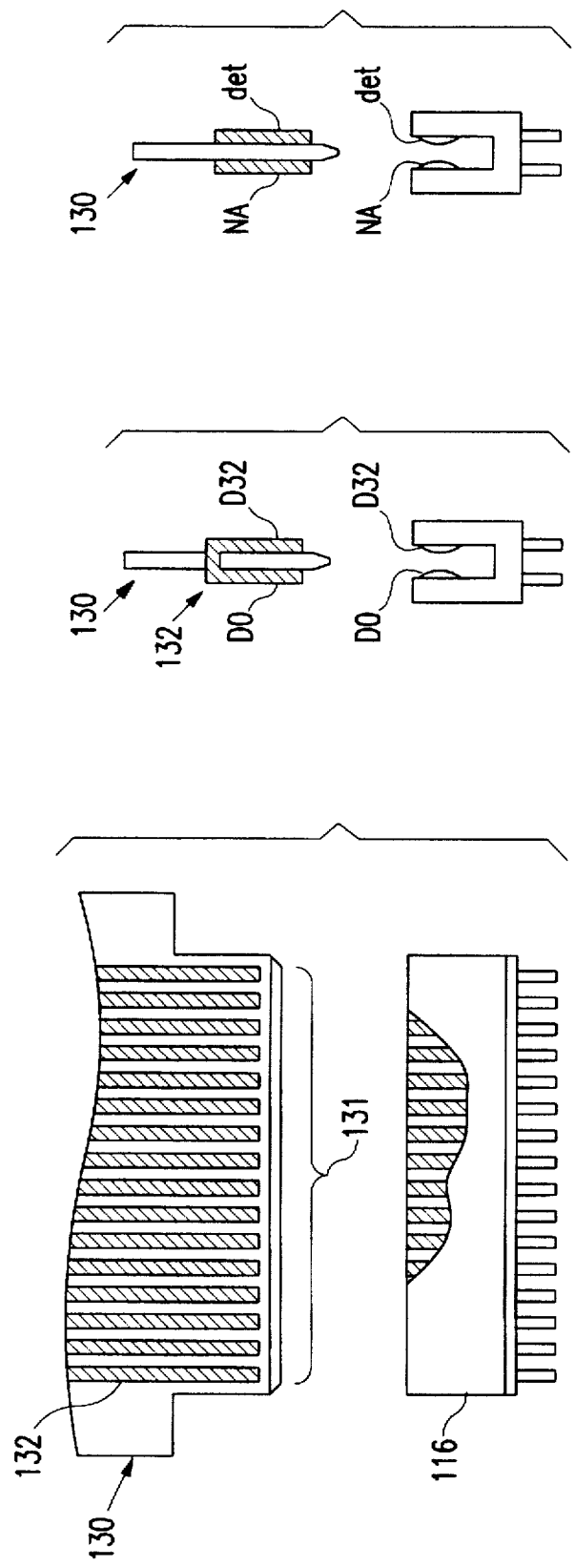
FIG. 6a–6c show a cross-section of primary portions of a connector 116 and a bus connector board 130.

FIG. 6 shows a cross-sectional view of primary portions of the configuration of the connector 116 and the bus connector board 130. As shown in FIG. 6 (A), the bus connector board 130 has a connector section 131 with edges on both sides thereof. In FIG. 6, conductive sections are hatched. The terminals D0–D31 for the upper 32 bits and the terminals D32–D63 for the lower 32 bits of the data bus are provided on both sides of the board, respectively. Conducting portions of the associated terminals are conductively coupled to one another through through-holes 132. FIG. 6 (B) is a cross-sectional view of the terminals D0 and D32. The terminals BE0–BE3 and BE4–BE7 of the byte enable signal are conductively coupled in a similar manner. Through-holes are not provided for terminals other than the above signals, as shown in FIG. 6 (C).

When the first CPU module 100 is installed, associated bus lines of the upper 32 bits and the lower 32 bits of the 64-bit data bus are coupled together. As a result, the same data is outputted to the upper 32 bits and the lower 32 bits of the processor data bus. Accordingly, a bus control circuit (that is described later) can perform a control in a similar manner as it preforms the control for a 32-bit processor data bus. The bus control is made easy.

In the above described embodiment, associated bus lines of the upper 4 bits and the lower 4 bits of the byte enable signals are coupled together. Therefore, the upper 32 bits and the lower 32 bits of the data bus have the same effective byte. As a result, the bus control is further facilitated.

As shown in FIG. 3 (C), when the second CPU module 120 is installed, the module determination terminal det of the connector 116 is grounded so that the module determination signal det becomes a level "0". On the other hand, as shown in FIG. 4 (D), when the first CPU module 100 is installed, the module determination terminal det is opened. As a result, the module determination signal det becomes a level "1". Accordingly, by checking the level of the module determination signal det, which one of the first CPU module and the second CPU module is installed can be determined.

Figure 7:
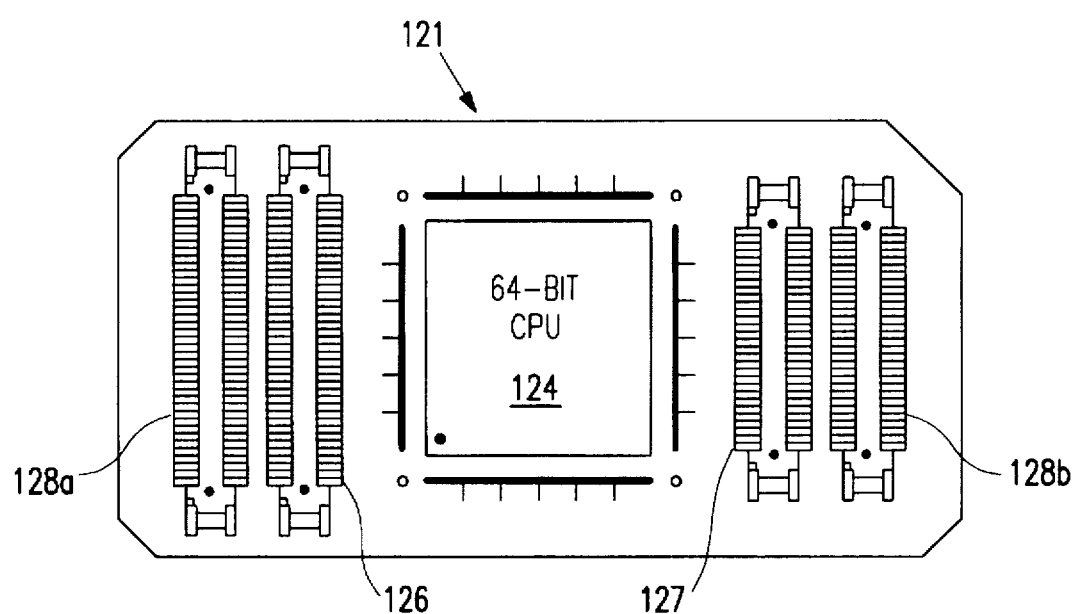
FIG. 7 shows a structure of a second CPU module in accordance with another embodiment.

A variety of CPU module terminal configurations are possible. FIG. 7 shows another configuration of a second CPU module. A CPU module 121 has connectors 128a and 128b having signal terminals (D32–D63, BE4–BE7, etc.) required for a 64-bit CPU 124. The connectors 128a and 128b are provided at the exterior sides of connectors 126 and 127 for a 32-bit CPU. In another configuration, only three connectors 126, 128b and 128b shown in FIG. 7 are provided, and the connector 127 is not provided. In such a case, when a 32-bit CPU is installed, the connectors 126 and 128b are used, and a bus connector board 130 is mounted on the connector 128a. When a 64-bit CPU is installed, the bus connector board 120 is removed, and the connector 128a and 128b are used.

B. Method of Expanding Secondary Cache

Figure 8A:
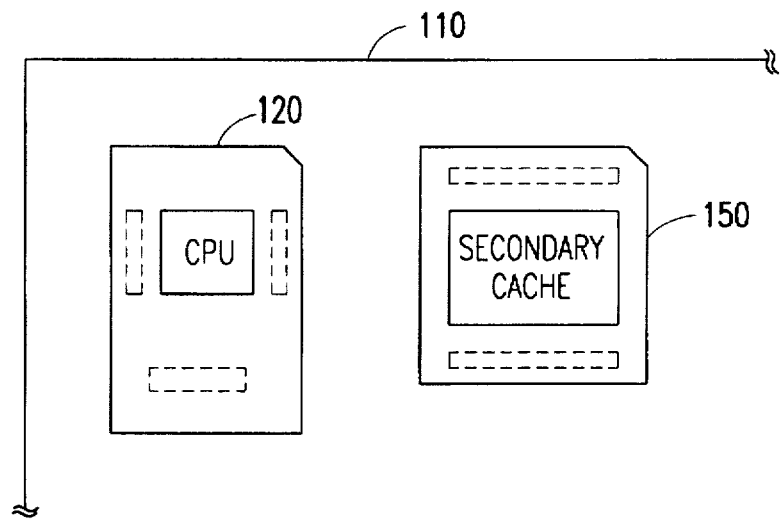
FIG. 8a–8c illustrate a method of expanding a secondary cache.
Figure 8B:
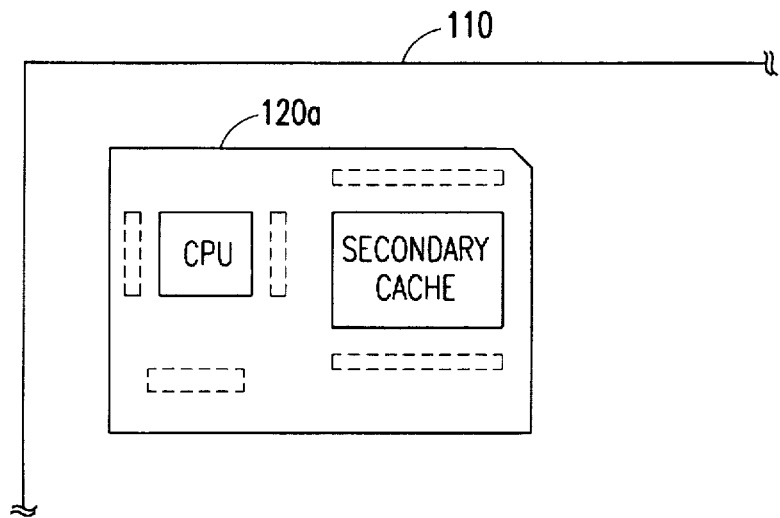
Figure 8C:
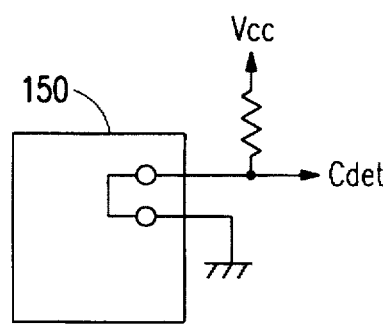

FIG. 8 illustrates an idea of expanding an external cache circuit that is called a secondary cache. FIG. 8 (A) illustrates a case in which an independent cache module 150 is installed in addition to the second CPU module 120 shown in FIG. 2. Also, FIG. 8 (B) shows a secondary cache provided within a second CPU module 120a. In the configuration shown in FIG. 8 (B), an arrangement may be made so that the secondary cache is fixed to the CPU module, and the CPU is removably attached to a socket on the CPU module. If the independent cache module 150 is used as shown in FIG. 8 (A), the secondary cache may be expanded based on the requirements of a user. On the other hand, there are advantages in which the secondary cache may not required to be changed at the time of a CPU upgrade. The cache for the first CPU module 100 can be expanded by using the methods illustrated in FIGS. 8 (A) and (B).

The level at a cache determination terminal provided at a connector of the cache module 150 determines whether or not the secondary cache is expanded. FIG. 8 (C) shows how a cache determination signal Cdet is generated depending upon the connection condition of the connector of the cache module 150. When the cache module 150 is installed, the cache determination terminal Cdet is grounded so that the cache determination signal becomes to be the level "0". When the cache module 150 is not installed, the cache determination terminal Cdet is opened. As a result, the cache determination signal becomes to be the level "1". Accordingly, by checking the level of the cache determination signal Cdet, a determination can be made whether or not the secondary cache is expanded. A memory controller (that is described later) selects if the secondary cache control is effected or canceled in response to the level at the cache determination terminal Cdet. Also, an optimum memory control can be achieved by the presence or the absence of the secondary cache.

C. Construction of Computer

Figure 9:
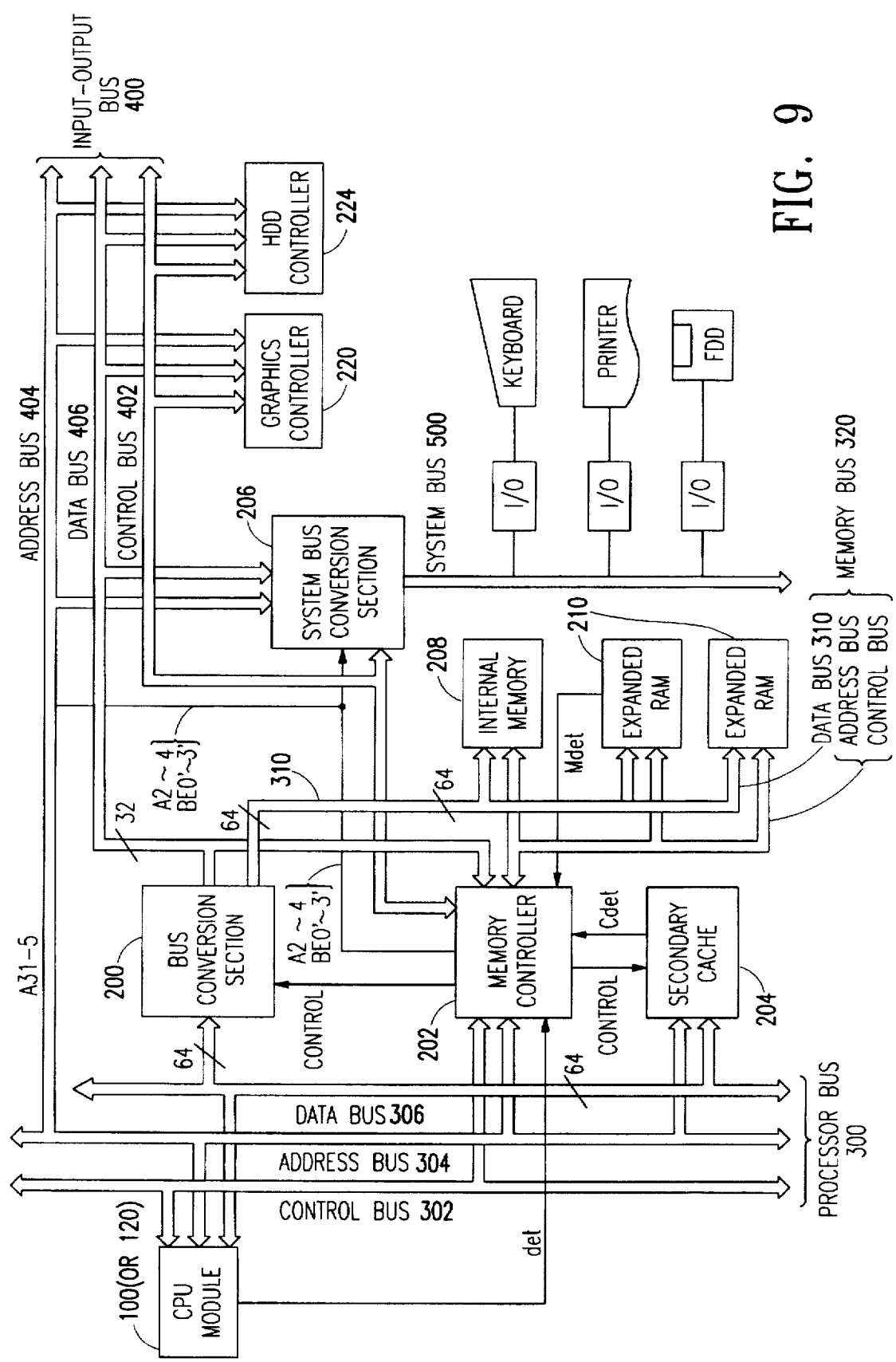
FIG. 9 shows a block diagram of the structure of a computer in accordance with an embodiment.

FIG. 9 shows a block diagram of the construction of a personal computer in accordance with an embodiment of the present invention. The personal computer includes a CPU module 100 (or 120), a bus conversion section 200, a memory controller 202, a secondary cache 204, a system bus conversion section 206, an internal memory (including ROM and RAM) 208, and an expanded RAM 210. It is noted that a user can decide whether or not the secondary cache 208 and the expanded RAM 210 are provided.

A module determination signal det outputted from the CPU module 100 (or 120) and a cache determination signal Cdet outputted from the cache module are provided to the memory controller 202. A memory determination signal Mdet outputted from a terminal of the expanded RAM 210 is also provided to the memory controller 202. The terminal for generating the memory determination signal has the same structure as the structure of the module determination terminal det shown in FIG. 3 (C), or the structure of the cache determination terminal Cdet shown in FIG. 8 (C). As described later, the memory controller 202 executes appropriate controls over the specific computer structure according to the determination signals det, Cdt and Mdet.

Either a 32-bit CPU 104 or a 64-bit CPU 124 can be selected and installed. A processor bus 300 that is coupled to the CPU is comprised of a control bus 302, an address bus 304, and a 64-bit data bus 306.

The upstream side of the bus conversion section 200 is coupled to the 64-bit data bus 306, and the downstream side is coupled to a 64-bit memory data bus 310 and a 32-bit input-output data bus 406. The memory data bus 310 is coupled to the internal memory 208 and the expanded RAM 210. The bus conversion section 200 is a circuit that performs bus conversion between the processor data bus 306 and the input-output data bus 406, and between the processor data bus 306 and the memory data bus 310. The internal structure and the operation of the bus conversion section 200 are described later.

The upstream side of the memory controller 202 is coupled to the control bus 302 and the address bus 304 of the processor bus 300. The memory controller 202 provides a physical address and a control signal to the internal memory 208 and the expanded RAM 210, and performs input-output control over these memories. Also, the memory controller controls the secondary cache 204 when the secondary cache 204 is installed. The downstream side of the memory controller 202 is coupled to an input-output control bus 402.

An input-output bus 400 is comprised of a 32-bit data bus 406, an address bus 404, and a control bus 402. The input-output bus 400 is a relatively high speed bus and is coupled to the system bus conversion section 206 to a graphics controller 220 and a hard disc controller 224. The graphics controller 220 is coupled to a VRAM (Video RAM) (not shown), a display device and the like.

The system bus conversion section 206 is a circuit that performs a bus conversion between the input-output bus 400 and a system bus 500. The system bus 500 is a relatively low-speed bus having a 16-bit data bus, and is coupled to a keyboard, a printer, a floppy disk drive and the like are coupled through the I/O controller.

The system bus conversion section 206 includes a highest speed processor bus 300 having a 64-bit data bus width, a high speed memory bus 320 having a 64-bit data bus width, a relatively high speed input-output bus 400 having a 32-bit data bus width, and a relatively low speed system bus 500 having a 16-bit data bus width. Bus conversion between the processor bus 300 and the input-output bus 400, and between the processor bus 300 and the memory bus 320 is primarily performed by the bus conversion section 200. Bus conversion between the input-output bus 400 and the system bus 500 is primarily performed by the system bus conversion section 206.

D. Internal Structure of Memory Controller 202

Figure 10:
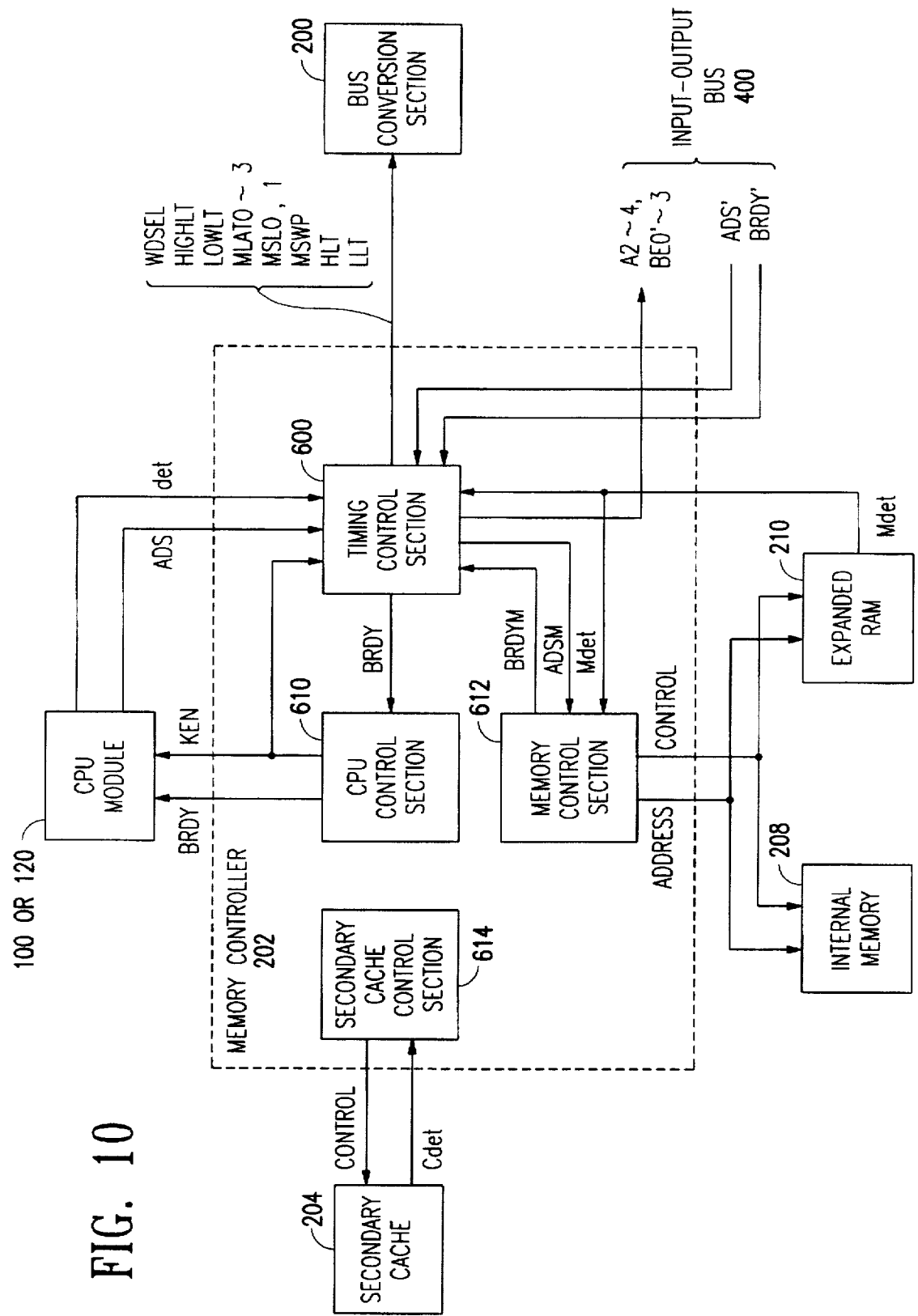
FIG. 10 shows a block diagram of the internal structure of a memory controller 202.

FIG. 10 shows a block diagram of an internal structure of the memory controller 202. The memory controller 202 has a timing control section 600, a CPU control section 610, a memory control section 612 and a secondary cache control section 614. FIG. 10 shows only signals related to the embodiment. Other signals are omitted for convenience.

The timing control section 600 receives a module determination signal det from the CPU module, and also receives a memory determination signal Mdet from the terminal of the expanded RAM 210. The timing control section 600 provides a variety of signals to the memory control section 612 and the bus conversion section 200 in response to the determination signals det and Mdet. The memory control section 612 provides an address and a control signal to the internal memory 208 and the expanded RAM 210 for controlling the memories based upon the signals provided by the timing control section 600. The CPU control section 610 supplies to the CPU a cache enable signal KEN that indicates whether or not the cache is effective, and a burst ready signal BRDY that indicates the completion of a bus cycle. The secondary cache control section 614 receives a cache determination signal Cdet from the cache module, and performs control over the secondary cache 204 if the secondary cache is expanded. The control of the secondary cache 204 by the secondary cache section 614 will be described later.

It is noted that an address outputted from the 32-bit CPU 104 includes an upper address of 30 bits A31–A2, and a lower address of 4 bits BE0–BE3 as a byte enable signal. Namely, an address consisting of 4 bytes are designated by the upper address A31–A2, and an effective byte among the 4 bytes is indicated by each of BE0–BE3 in the byte enable signal. An address outputted from the 64-bit CPU includes an upper address of 29 bits A31–A3 and a lower address of 8 bits BE0–BE7 as a byte enable signal. An address of 8 bytes is designated by the upper address A31–A3, and an effective byte among the 8 bytes is indicated by each of BE0–BE7 in the byte enable signal. For example, when the byte enable signal is at "L" level at BE0, the least significant one byte among the 8 bytes is effective. When the byte enable signal is at "L" level at BE7, the most significant one byte among the 8 bytes is effective. When all the eight bytes are effective, the byte enable signal is at "L".

As shown above, different CPUs having different data bus widths provide different addresses. The timing control section 600 therefore adjusts an address signal depending upon the data bus width of an installed CPU.

Figure 11:
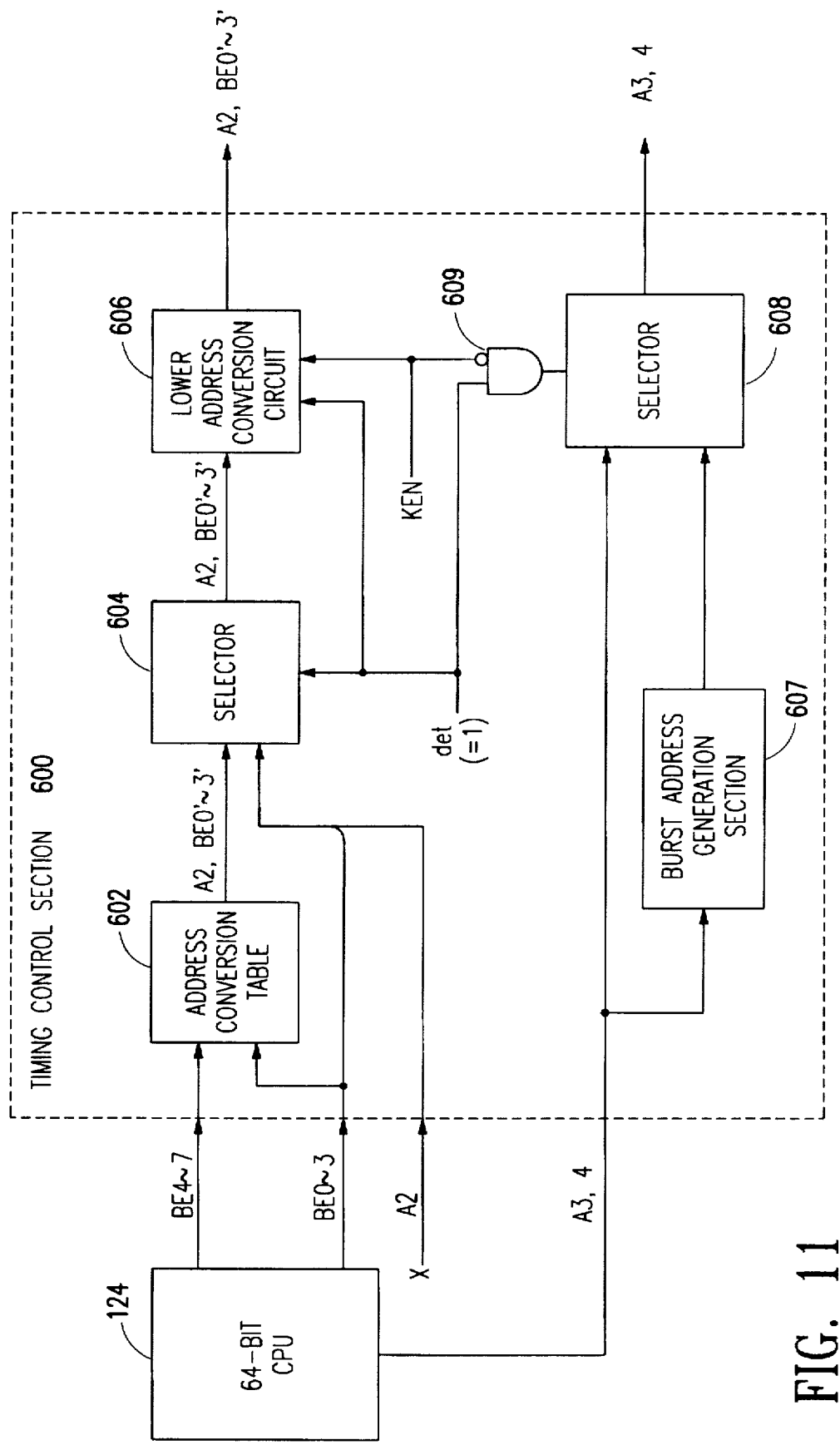
FIG. 11 shows a block diagram of a structure of an address adjustment circuit that in included in a timing control section 600 when a 64-bit CPU is installed.

FIG. 11 shows a block diagram of the structure of an address adjusting circuit that is included in the timing control section 600. The figure shows an embodiment in which a 64-bit CPU 124 is installed. The address adjusting circuit has an address conversion table 602, a first selector 604, a lower address conversion circuit 606, a burst address generation section 607, a second selector 608, and an AND gate 609. When the 64-bit CPU is installed, the CPU 124 provides an 8-bit enable signal consisting of BE0–BE7, but does not provide an address A2. The address table 602 is used to convert an 8-bit byte enable signal consisting of BE0–BE7 into an address A2 and a byte enable signal consisting of BE0'–BE3'∝ for a 32-bit data bus.

It is noted that the address A2 and the 4-bit byte enable signal consisting of BE0– BE3 indicate which bytes in the continuous 64 bits (8 bytes) are effective, and therefore has substantially the same function as that of the 8-bit byte enable signal consisting of BE0–BE7. In other words, both a combination signal of the address A2 and the 4-bit byte enable signal consisting of BE0–BE3, and the 8-bit byte enable signal consisting of BE0–BE7 are signals that indicate which bytes in the data bus width (64 bits) of the second CPU module 120 are effective.

Figure 12:
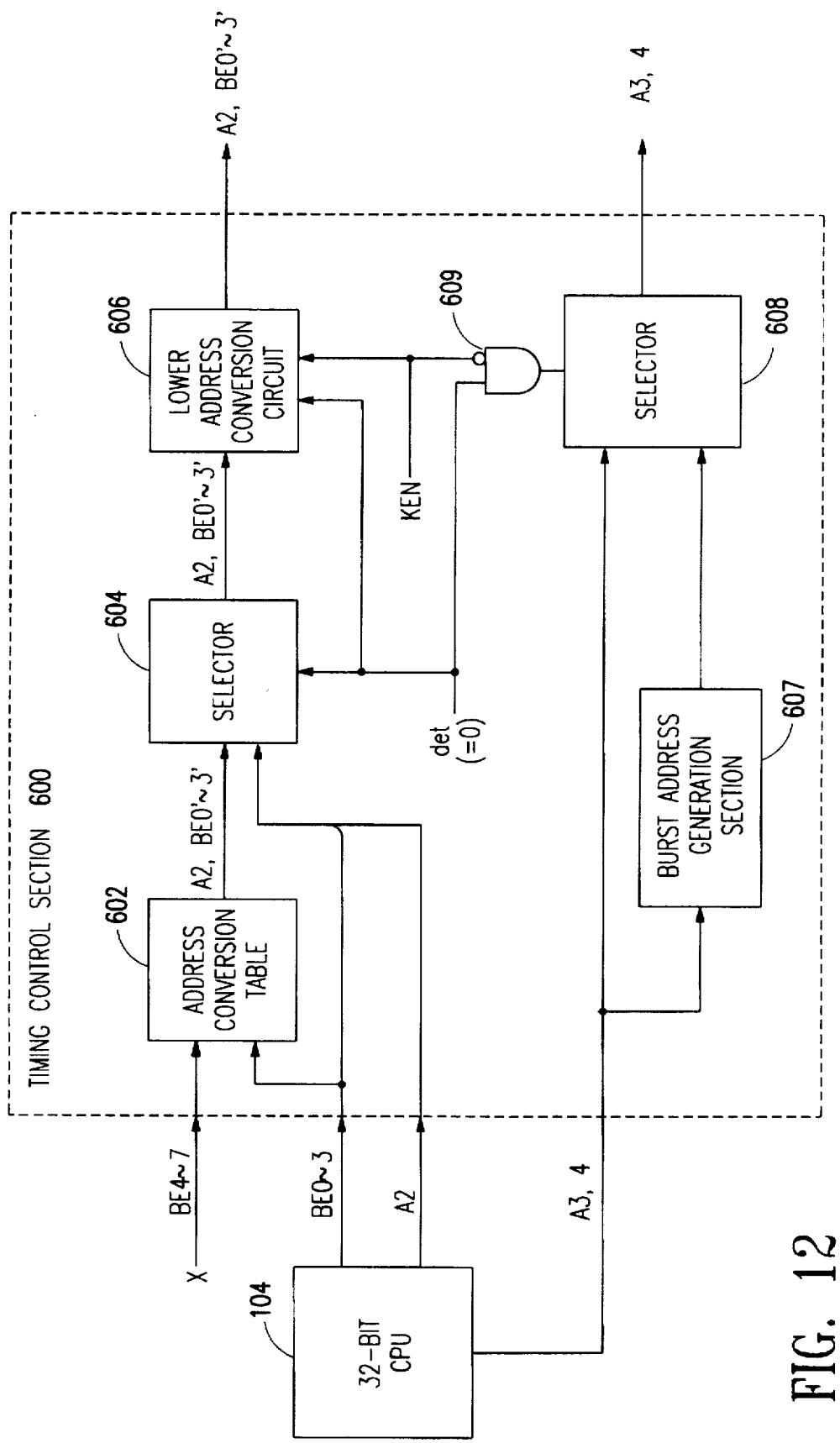
FIG. 12 shows a block diagram of the structure of an address adjustment circuit when a 32-bit CPU is installed.

When a 32-bit CPU 104 is installed, as shown in FIG. 12, the CPU 104 provides a 4-bit byte enable signal consisting of BE0–BE3 and an address A2, and also provides the same byte enable signal consisting of BE0–BE3 as an upper byte enable signal BE4–BE7. The byte enable signal consisting of BE0–BE3 and the address A2 outputted from the 32 bit CPU 104 are inputted in the selector as it is, and then outputted as the lower address A2 and BE0'–BE3' as it is.

Tables 1 and 2 below illustrate the relation between inputs and outputs provided by the address conversion table 602. In Tables 1 and 2, "H" indicates "H" level, "L" indicates "L" level, and "X" indicates a specified level. The level of the address A2 is determined by AND condition of each input signal shown in Table 1. The byte enable signal BE0'–BE3' is determined by OR condition of each input signal shown in Table 2.

TABLE 1

Input-Output of Byte Enable Generation Circuit 602

| INPUT (AND CONDITION) | | | | | | | | OUTPUT |
|---|---|---|---|---|---|---|---|---|
| BE7 | BE6 | BE5 | BE4 | BE3 | BE2 | BE1 | B30 | A2 |
| X | X | X | X | X | X | X | L | 0 |
| X | X | X | X | X | X | L | H | 0 |
| X | X | X | X | X | L | H | H | 0 |
| X | X | X | X | L | H | H | H | 0 |
| X | X | X | L | H | H | H | H | 1 |
| X | X | L | H | H | H | H | H | 1 |
| X | L | H | H | H | H | H | H | 1 |
| L | H | H | H | H | H | H | H | 1 |

TABLE 2

| INPUT (OR CONDITION) | | | | | | | | OUTPUT | | | |
|---|---|---|---|---|---|---|---|---|---|---|---|
| BE7 | BE6 | BE5 | BE4 | BE3 | BE2 | BE1 | BE0 | BE3' | BE2' | BE1' | BE0' |
| L | X | X | X | L | X | X | X | L | X | X | X |
| X | L | X | X | X | L | X | X | X | L | X | X |
| X | X | L | X | X | X | L | X | X | X | L | X |
| X | X | X | L | X | X | X | L | X | X | X | L |

The selector 604 selects one of the lower address A2, BE0'-BE3' generated by the address conversion table 602 and the lower address A2, BE0-BE3 outputted from the CPU, based upon the module determination signal det. When the 64-bit CPU 124 is installed, the lower address A2, BE0'-BE3' is selected. When the 32-bit CUP 104 is installed, the lower address A2, BE0-BE3 outputted from the CPU 104 is selected. The address A2 selected by the selector 604 is outputted, and the byte enable signal BE0'-BE3' is provided to the lower address conversion circuit 606.

The lower address conversion circuit 606 converts the address A2 and the byte enable signal BE0'-BE3' according to the cache enable signal KEN. The cache enable signal KEN is a signal that is generated by the CPU control section 610 (FIG. 10) and indicates whether caching is effective or void. Caching is effective only in a part of the address space of a memory. An effective caching address range is registered in the memory controller 202. When the CPU reads data from a memory, an address is transferred to the memory controller 202. The CPU control section 610 determines whether or not the address is within the effective caching address range, and provides a cache enable signal KEN.

A cache of the 32-bit CPU 104 has cache lines, each composed of 16 bytes. Data in the memory is read out and fetched to the cache for each cache line. Therefore, to read data for one cache line from the memory and fetch it to the cache of the 32-bit CPU 104, data transfer is required four times with all the 32 bits (4 bytes) being effective. A cache of the 64-bit CPU 124 has cache lines, each composed of 32 bytes. Therefore to read data for one cache line from the memory and fetch it to the cache of the CPU 124, data transfer is required four times with all the 64 bits (8 bytes) being effective. Namely, in both of the CPUs, within an effective caching address range, data for one cache line is read into the cache by successively reading data four times with the entire data bus width being effected.

The operation of successively reading or writing data plural times is called the burst cycle or the burst transfer. When the 32-bit CPU 104 is installed, the lower address conversion circuit 606 converts all the four bits BE0'-BE3' of a byte enable signal to "L" level in case of an effective caching burst reading cycle. When the 64-bit CPU 124 is installed, the lower address conversion circuit 606 converts all the four bits BE0'-BE3' of a byte enable signal to "L" level, and changes the value of the address A2 to "0" and to "1", successively.

A burst address generation section 607 (FIGS. 11 and 12) is a circuit that generates an address A3, A4 required for the burst cycle. During the burst cycle of the 64-bit CPU, the address A3, A4 is required to be successively incremented while the transfer of eight bytes is performed four times. However, the 64-bit CPU does not increment the address A3, A4. Therefore, the burst address generation section 607 successively increments the address A3, A4 in synchronism with the transfer repeated four times. The cache enable signal KEN and the module determination signal det are inputted in the AND gate 609. An output from the AND gate 609 is provided to a selection signal terminal of the second selector 608. When the 64-bit CPU 124 is installed, the burst cycle is performed when caching is effective. In this respect, the address A3, A4 generated by the burst address generating section 607 are selected in response to the cache enable signal KEN and outputted to the input-output bus 400. It is noted that when the 32-bit CPU 104 is installed, the CPU 104 increments addresses A2 and A3 during the burst cycle. Accordingly, the addresses A2 and A3 are outputted from the first selector 604 and the second selector 608 as it is, respectively.

FIG. 13 shows a timing chart of a bus cycle when data is read from a memory that is coupled to the input-output bus 400 into the 64-bit CPU 124. For a reading cycle in which caching is void, as shown in FIGS. 13 (a)-(i), the CPU outputs an address status signal ADS and a new bus cycle is started. The timing control section 600 outputs to the input-output bus 400 an address status signal ADS' (FIG. 14 (e)) that indicates the start of a bus cycle. The memory controller 202 determines whether or not an address A31-A3 (in effect, an address A31-A5 for each 32 bytes) is within the effective caching address range. In case caching is void, the cache enable signal KEN is maintained at "H" level. In this case, the lower address conversion circuit 606 outputs the lower address A2, BE0'-BE3' that is provided from the first selector 604. The second selector 608 outputs the address A3, A4 (not shown) that is provided from the CPU 124. When data is transferred to the input-output data bus 406, the input-output data bus 406 generates a burst ready signal BRDY' to notify to the timing control section 600 that the data has been transferred. By this, the bus cycle is completed.

When caching is effective, as shown in FIGS. 13 (j)-(r), the cache enable signal KEN goes to "L" level. Accordingly, the lower address conversion circuit 606 converts all of BE0'-BE3' of the byte enable signal provided from the first selector 604 to "L" level, and outputs a modified byte enable signal BE0'-BE3'. Also, the address A2 is successively changed to "0" and to "1" so that data composed of 64 bits is transferred in two sections, each having 32 bits. The second selector 608 selects and outputs the addresses A3, A4 (not shown) generated by the burst address generation section 607 in synchronism with the burst transfer of 64 bits repeated four times. When the 64-bit CPU 124 is installed, data having 32 bits is transferred eight times during the burst cycle. The timing control section 600 determines that a bus cycle is completed when eight pulses of the burst ready signal BRDY' are provided by the input-output bus 400.

As described above, the address conversion table 602 and the selector 604 adjust the lower address A2, BE0'-BE3' according to the data bus width of the CPU based on the module determination signal det. As a result, a lower address appropriate to the data bus width of an installed CPU can be generated. It is noted that the lower address A2–A4, BE0'–BE3' generated by the timing control section 600 together with the address A31–A5 of the processor address bus form the input-output address bus 404.

E. Internal Structure of Bus Conversion Section 200

Figure 14:
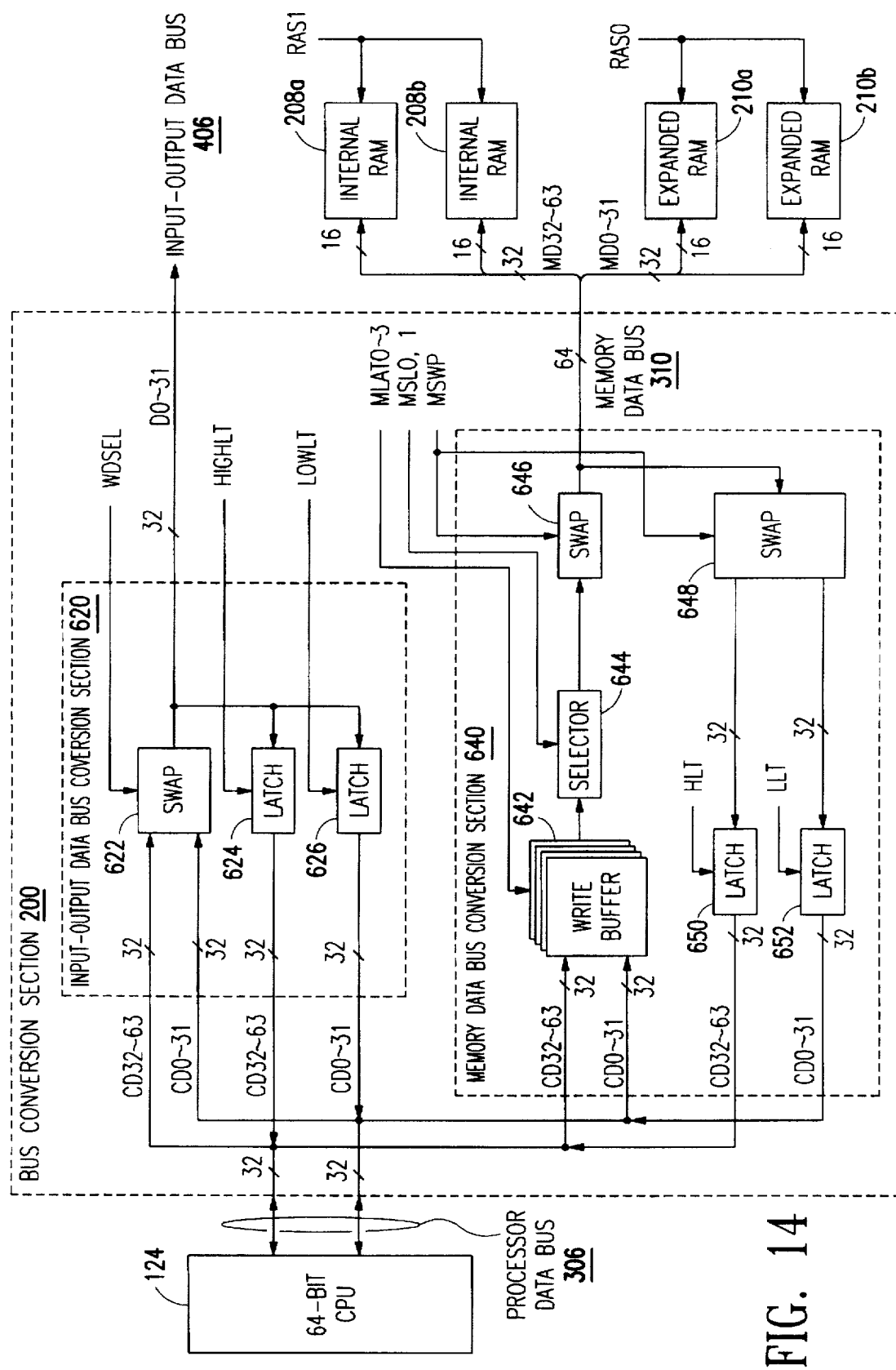
FIG. 14 shows a block diagram of the structure of a bus conversion section 200 when a 64-bit CPU is installed.
Figure 15:
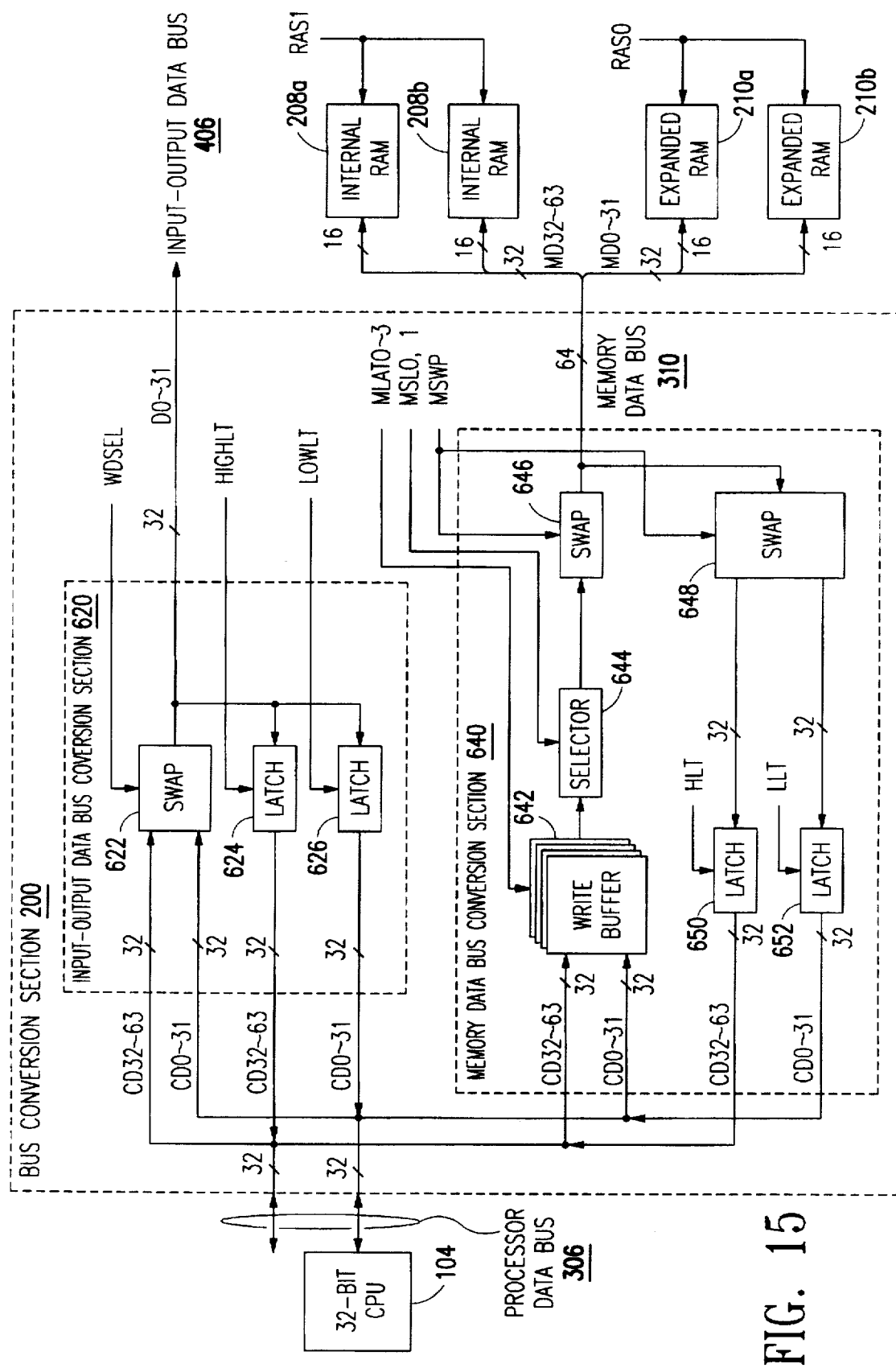
FIG. 15 shows a block diagram of the structure of a bus conversion section 200 when a 32-bit CPU is installed.

FIG. 14 shows a block diagram of an internal structure of the bus conversion section 200, in which a 64-bit CPU 124 is installed. FIG. 15 shows a case in which a 32-bit CPU 104 is installed. The bus conversion section 200 has an input-output data bus conversion section 620 that performs conversion between the processor data bus 306 and the input-output data bus 406, and a memory data bus conversion section 640 that performs conversion between the processor data bus 306 and the memory data bus 310.

The input-output data bus conversion section 620 includes a swap circuit 622, and two latch circuits 624 and 626. The memory data bus conversion section 630 includes a write buffer 642, a selector 644, two swap circuits 646 and 648, and two latch circuits 650 and 652. Hereunder, the operation of the input-output data bus conversion section 620 is described followed by a description of the operation of the memory data bus conversion section 640.

F. Operation of Input-Output Data Bus Conversion Section 620

The swap circuit 622 of the input-output data bus conversion section 620 selects one of upper 32 bits CD32–CD63 and lower 32 bits CD0–CD31 among 64-bit data provided from the CPU in response to a write data selection signal WDSEL provided by the memory controller 202. The swap circuit 622 then outputs the selected bits to the input-output data bus 406.

The two latch circuits 624 and 626 of the input-output data bus conversion section 620 each maintain data of 32 bits D0–D31 on the input-output data bus 406 in response to an upper latch signal HIGHLT, maintain a lower latch signal LOWLT provided by the timing controller section 600 (FIG. 10) within the memory controller 202, and output this data as 64-bit data to the processor data bus 306.

Figure 16:
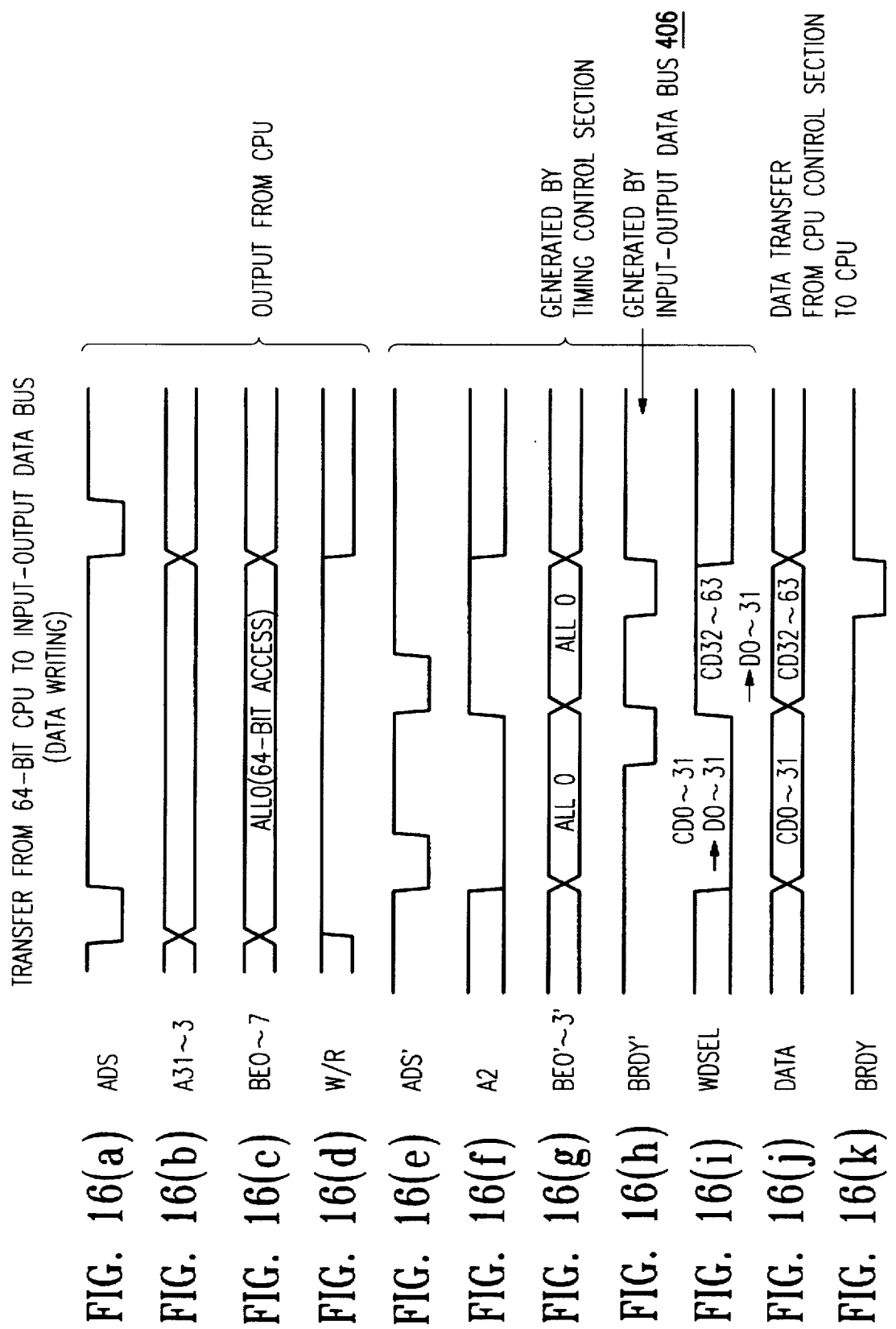
FIG. 16 shows a timing chart of a data transfer operation for transferring data from a 64-bit CPU 124 to an input-output data bus 406.

FIG. 16 shows a timing chart of the operation of transferring data from the 64-bit CPU to the input-output data bus 406. FIGS. 16 (a)–(d) show signals outputted from the CPU, FIGS. 16 (e)–(g) show signals generated by the memory controller 202, FIG. 16 (h) shows a signal generated by the input-output data bus 406, FIG. 16 (j) shows data that is transferred, and FIG. 16 (k) shows a signal outputted from the memory controller 202 to the CPU.

The CPU 124 first brings an address status signal ADS shown in FIG. 16 (a) down to "L" level, and at the same time, outputs an address A31–A3 (FIG. 16 (b)) and a byte enable signal BE0–BE7 (FIG. 16 (c)), and sets a write/read signal W/R (FIG. 16 (d)) to "H" level (write). It is noted that an embodiment is described hereunder for a case in which the byte enable signal is at "L" level at all BE0–BE7 as shown in FIG. 16 (c), and thus all the 64 bits are effective.

The timing control section 600 (FIG. 10) generates an address status signal ADS' (FIG. 16 (e)) in response to the above described signals, and outputs the same to the input-output data bus 406. The timing control section 600 generates and outputs an address A2 (FIG. 16 (f)) and a byte enable signal BE0'–BE3' (FIG. 16 (g)). An address A3, A4, which is provided from the CPU, is outputted from the timing control section 600. The timing control section 600 also brings down the write select signal WDSEL (FIG. 16 (i)) to "L" level, and instructs to select the lower 32 bits CD0–CD31. As a result, data of the lower 32 bits CD0–CD31 is outputted from the swap circuit 622 as the 32 bits D0–D31 on the input-output data bus 406 (FIG. 16 (j)).

When data is inputted to the input-output data bus 406, the input-output data bus 406 outputs a burst ready signal BRDY' (FIG. 16 (h)) to the timing control section 600 to notify that the data is outputted. The timing control section 600 again brings the address status signal ADS+ down (FIG. 16 (e)), to start data transfer of the upper 32 bits. Namely, by setting the address A2 (FIG. 16 (f)) to "1", and raising the write select signal WDSEL to "H" level, the upper 32 bits CD32–CD63 are selected. As a result, data of the upper 32 bits CD32–CD63 is outputted from the swap circuit 622 to the input-output data bus 406 (FIG. 16 (j)).

When data of the lower 32 bits CD0–CD31 and data of the upper 32 bits CD32–CD63 are successively transferred to the input-output data bus 406, the memory controller 202 outputs a burst ready signal BRDY (FIG. 16 (k)) to the CPU 124, to notify that the data transfer is completed.

Figure 17:
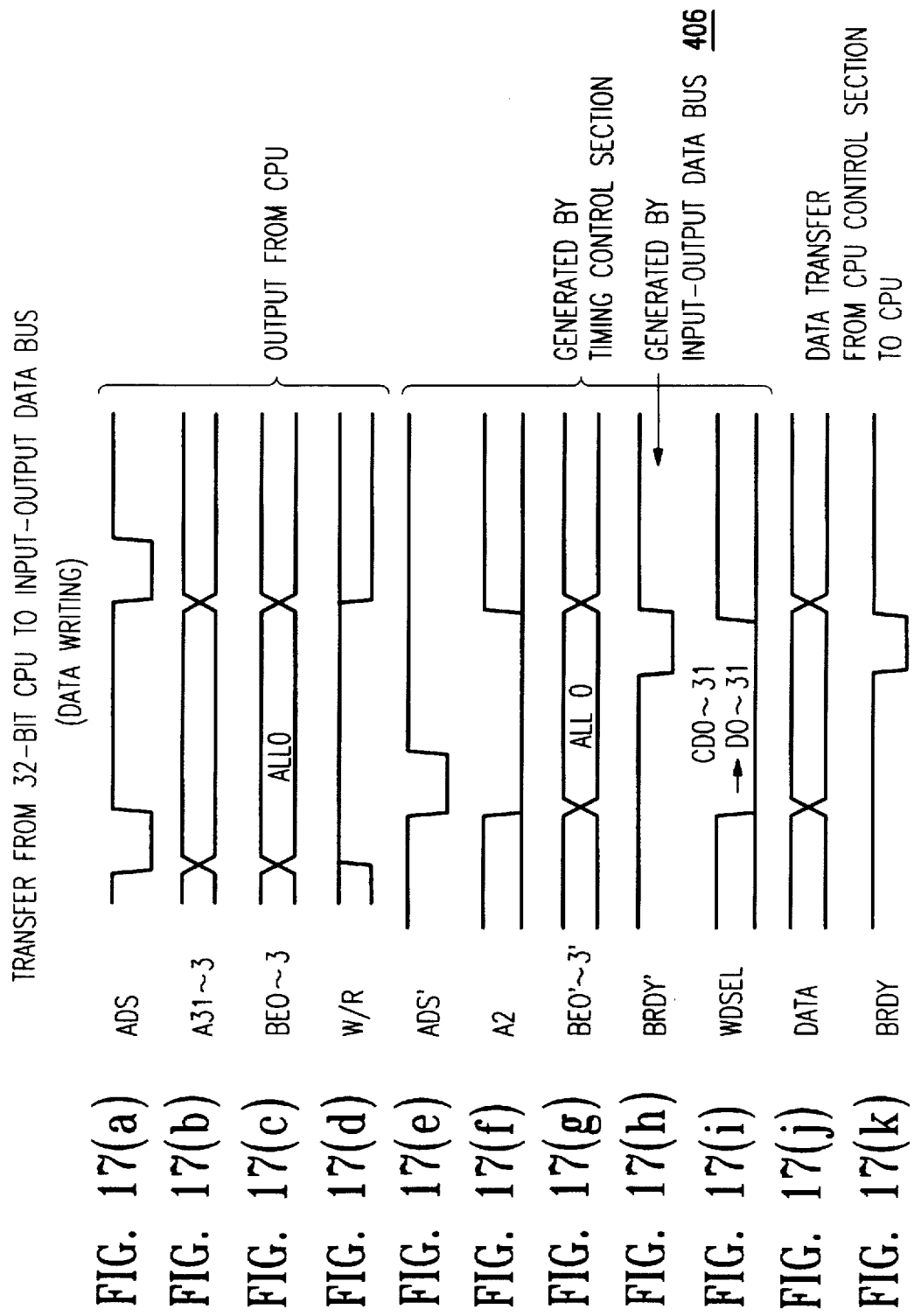
FIG. 17 shows a timing chart of a data transfer operation for transferring data from a 32-bit CPU 104 to an input-output data bus 406.

FIG. 17 shows a timing chart of the operation of data transfer from the CPU to the input-output data bus 406 when the 32-bit CPU 104 is installed. The operation shown in FIG. 17 is generally similar to the former half of the operation shown in FIG. 16. However, as shown in FIG. 17 (b), the 32-bit CPU 104 outputs an address status signal ADS (FIG. 17 (a)) as well as an address A31–A2 and a byte enable signal BE0–BE3. When data of the lower 32 bits CD0–CD31 is transferred to the input-output data bus 406, the memory controller 202 outputs a burst ready signal BRDY (FIG. 17 (k)) to the CPU 104, to notify that the data transfer is completed.

When the 32-bit CPU 104 is installed, the same data appears both on the lower 32 bits CD0–CD31 and the upper 32 bits CD32–CD63 of the 64-bit processor data bus 306. Therefore, the swap circuit 622 may select either of the lower 32 bits and the upper 32 bits and transfer the same to the input-output data bus 406. Also, either of the latches 624 and 626 may be used because the same data is transferred to the CPU 104.

When the memory controller 202 is instructed to transfer data by the CPU, the memory controller 202 selects and executes one of the two types of data transfer operation shown in FIG. 16 and FIG. 17 in response to the module determination signal det provided from the CPU module. Therefore, if a CPU having a different data bus width is installed, data can be transferred between the CPU and the circuits on the input-output bus 400.

A circuit capable of selecting more than one continuous bytes in response to the lower address (an 8-bit byte enable signal BE0'–BE7', or an address A2 and a 4-bit byte enable signal BE0'–BE3), such as the swap circuit 622, can be used.

Figure 18:
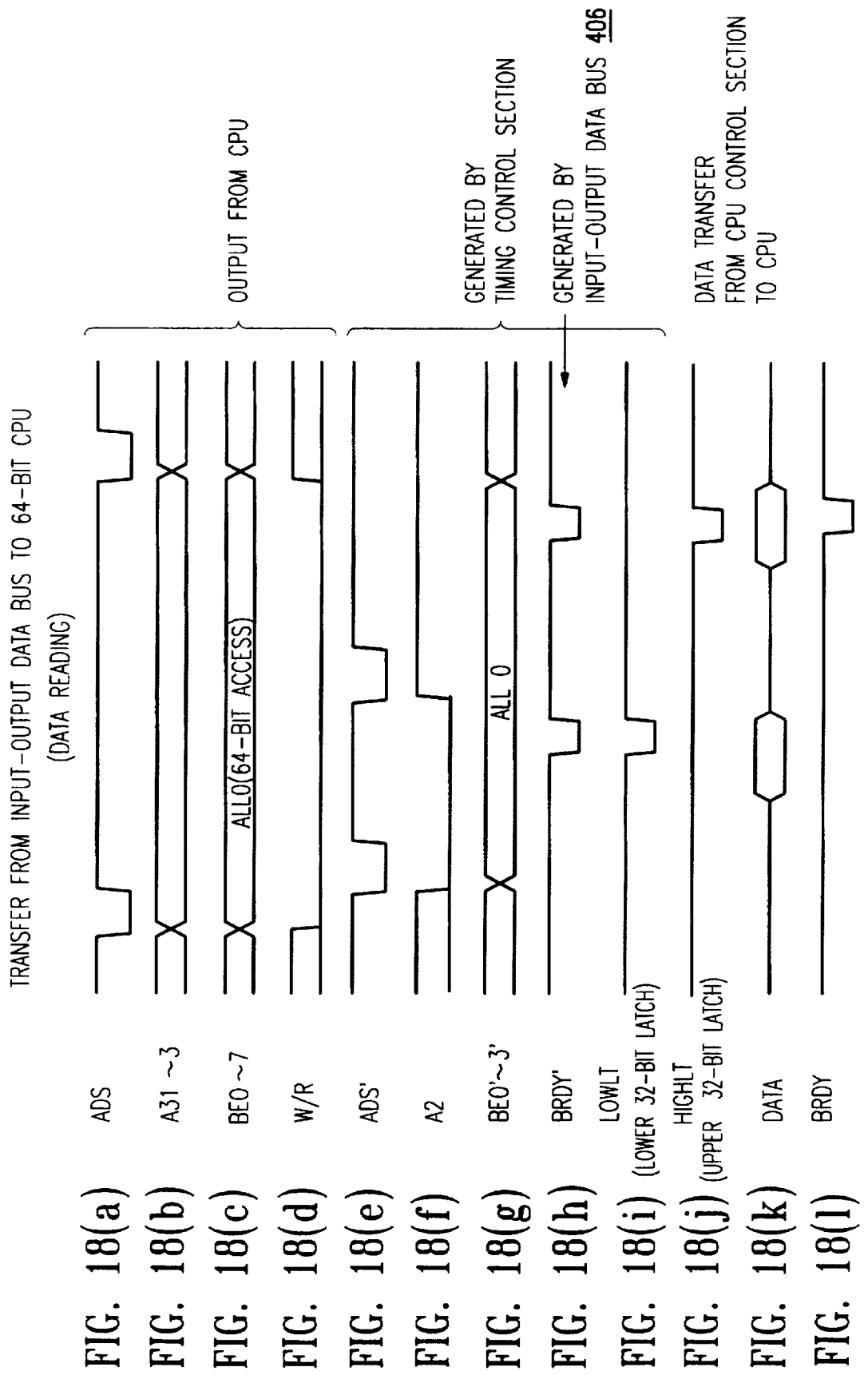
FIG. 18 shows timing chart of a data transfer operation for transferring data from an input-output data bus 406 to a 64-bit CPU 124.

FIG. 18 shows a timing chart of the operation of data transfer from the input-output data but 406 to the 64-bit CPU 124. FIGS. 18 (a)–(d) show signals outputted from the CPU, FIGS. 18 (e)–(g), (i) and (j) show signals generated by the memory controller 202, FIG. 18 (h) shows a signal generated by the input-output data bus 406, FIG. 18 (k) shows data to be transferred, and FIG. 18 (l) shows a signal that is outputted from the memory controller 202 to the CPU.

The CPU 124 first brings an address status signal ADS shown in FIG. 18 (a) down to "L" level, and at the same time, outputs an address A31–A3 (FIG. 18 (b)) and a byte enable signal BE0–BE7 (FIG. 18 (c)), and sets a write/read signal W/R (FIG. 18 (d)) to "L" level (write).

The timing control section 600 (FIG. 10) generates an address status signal ADS' (FIG. 18 (e)) in response to the above described signals, and outputs the same to the input-output data bus 406. Also, the timing control section 600 generates and outputs an address A2 (FIG. 18 (f)) and a byte enable signal BE0'-BE3' (FIG. 18 (g)). When data is outputted to the input-output data bus 406, the timing control section 600 brings down a lower latch signal LOWLT (FIG. 18 (i)) to "L" level, to maintain the data on the input-output data bus 406 in the lower side latch circuit 626. At this time, the input-output data bus 406 provides a burst ready signal BRDY' to the timing control section 600.

When the data of the lower 32 bits is latched, the timing control section 600 raises the address status signal ADS' (FIG. 18 (e)) again, sets the address A2 (FIG. 18 (f) to "1", and starts transferring the data of the upper 32 bits. When the 32-bit data is outputted to the input-output data bus 406, the timing control section 600 brings the upper latch signal HIGHLT down to "L" level to maintain the data on the input-output data bus 406 in the upper side latch circuit 624.

When the 32-bit data is maintained in the two latch circuits 624 and 636, respectively, in a manner described above, and 64-bit data is outputted to the processor data bus 306, the timing control section 600 outputs a burst ready signal BRDY (FIG. 18 (l)) to the CPU 124 through the CPU control section 610. The CPU 124 reads the 64-bit data.

Figure 19:
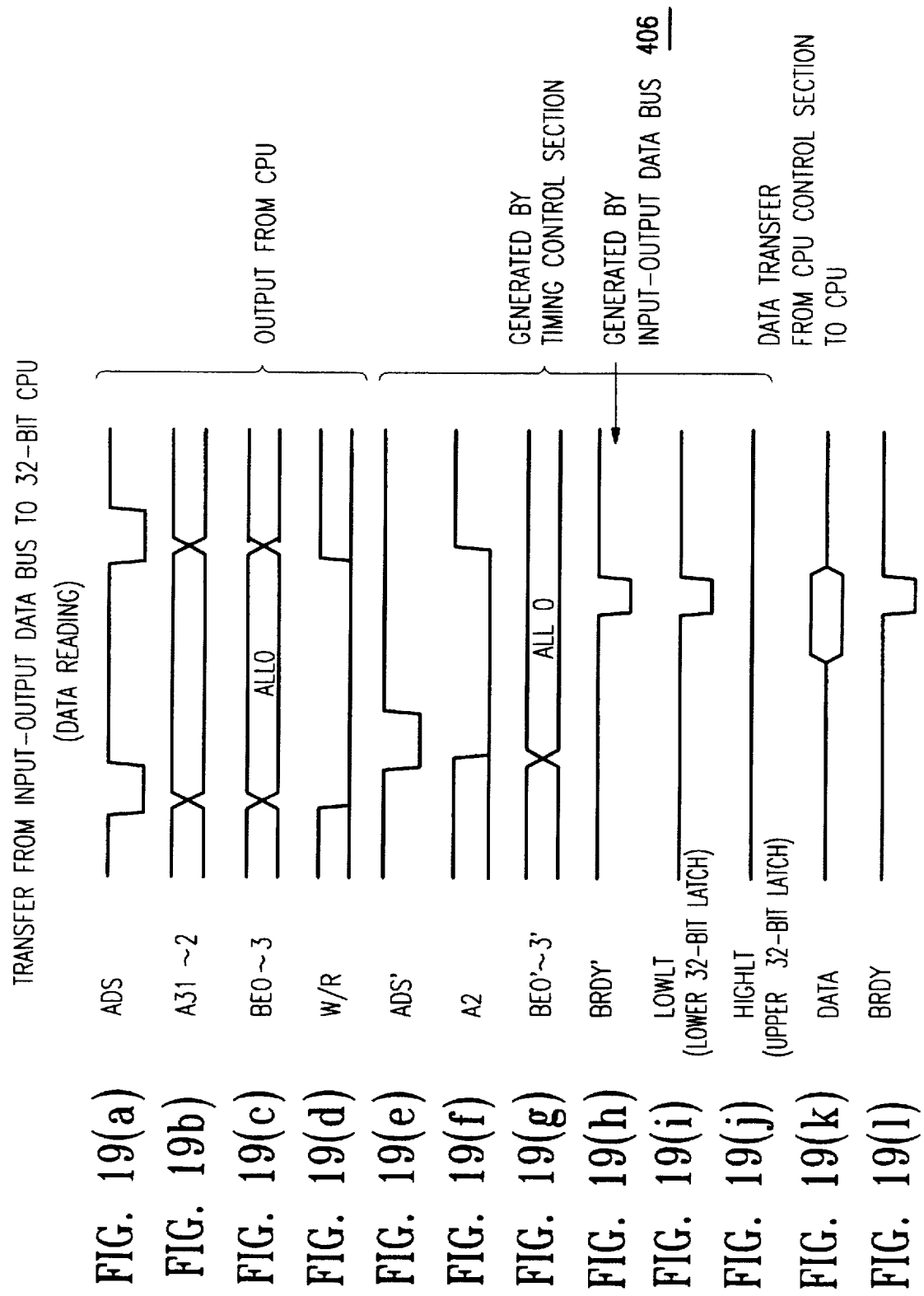
FIG. 19 shows a timing chart of a data transfer operation for transferring data from an input-output data bus 406 to a 32-bit CPU 104.

FIG. 19 shows a timing chart of the operation of transferring data from the input-output data but 406 to the CPU when the 32-bit CPU 104 is installed. FIG. 19 is generally similar to the former half of the timing chart shown in FIG. 18. Namely, when 32-bit data is latched in response to the lower latch signal LOWLT (FIG. 19 (i)), the memory controller 202 outputs a burst ready signal BRDY (FIG. 19 (l)) to the CPU 104, to indicate that the preparation of data transfer is completed. The memory controller 202, when data transfer is instructed by the CPU, selects and executes one of the two data transfer operations shown in FIG. 18 and FIG. 19, according to the module determination signal det provided by the CPU module.

As described above, the input-output data bus conversion section 620 selectively executes a data transfer operation that is appropriate to the 64-bit CPU 124 or the 32-bit CPU 104 according to the module determination signal det. As a result, data transfer between the processor data bus 306 and the input-output data bus 400 is performed regardless of whether the first CPU module or the second CPU module is installed.

G. Operation of Memory Data Bus Conversion Section 640

Figure 20:
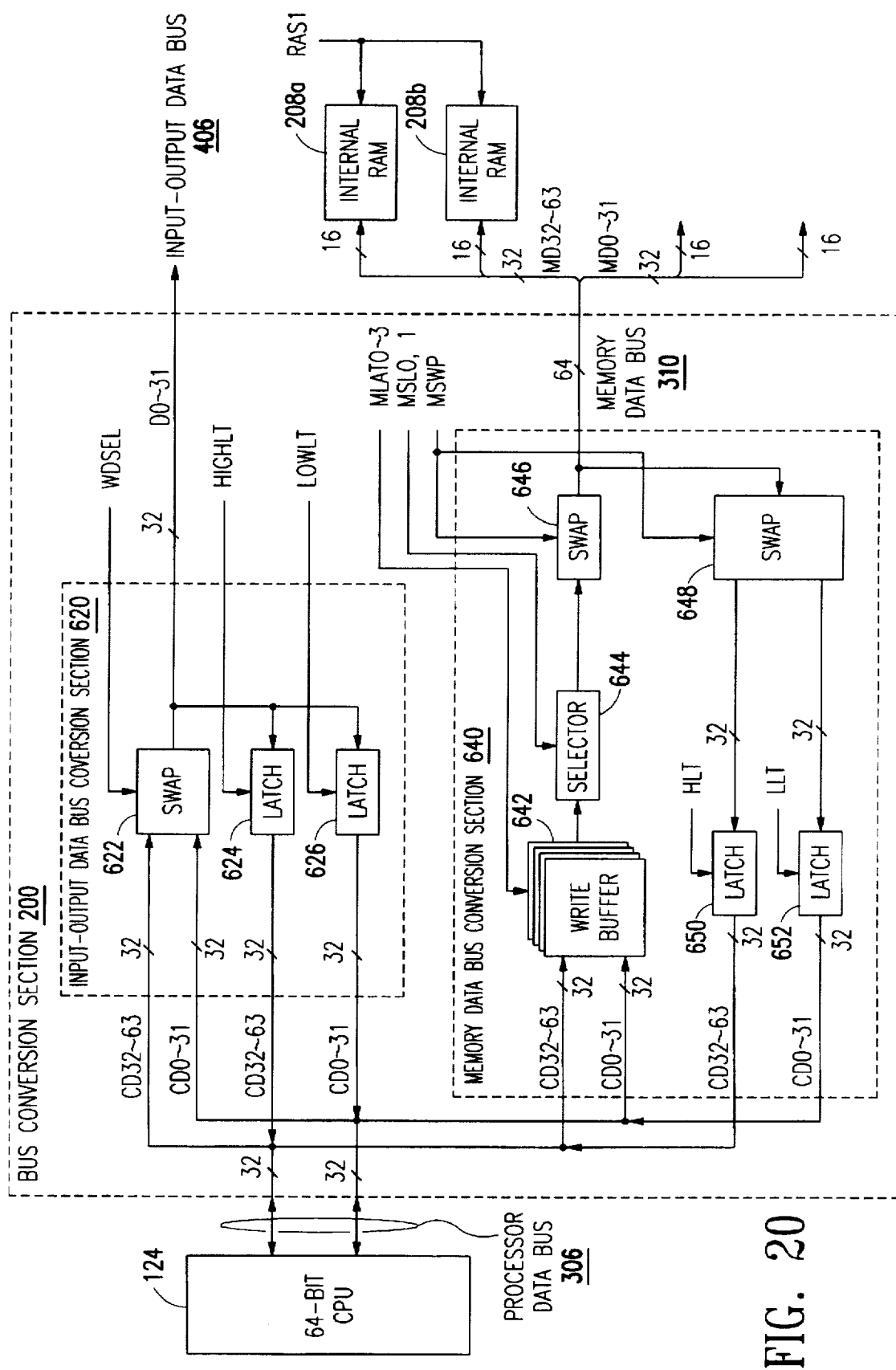
FIG. 20 shows a block diagram of the structure of a bus conversion section 200 when a 64-bit CPU 124 is installed and an expanded RAM 210 is not installed.
Figure 21:
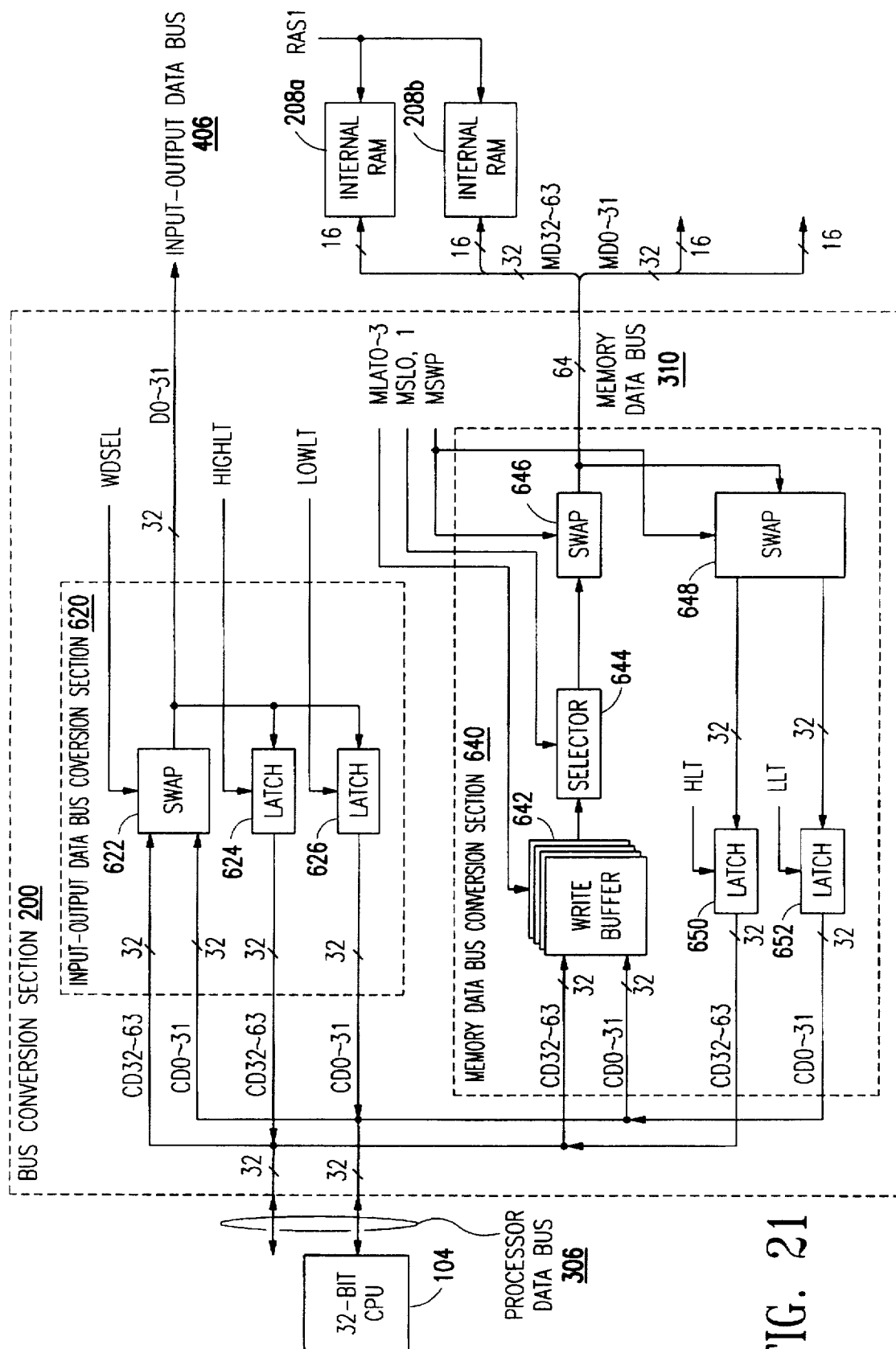
FIG. 21 shows a block diagram of the structure of a bus conversion section 200 when a 32-bit CPU 104 is installed and an expanded RAM 210 is not installed.

The operation of the memory data bus conversion section 640 differs depending upon whether or not the expanded RAM 210 is present. In both embodiments described above with reference to FIG. 14 and FIG. 15, the expanded RAM 210a and 210b are provided. Each of the internal RAMs 208a and 208b and the expanded RAMs 210a and 210b is formed from a RAM having, for example, 2 M-bytes capacity in a 16 bits×1 Mbyte format. FIG. 20 shows a structure in which a 64-bit CPU 124 is installed, but the expanded RAM 210 is not installed. FIG. 21 shows a structure in which a 32-bit CPU 104 is installed, but the expanded RAM 210 is not installed. In these embodiments, there are four CPU-RAM combinations as shown in FIG. 14, FIG. 15, FIG. 20 and FIG. 21.

Writing operations between a CPU and a memory in these four cases are summarized in Table 3 shown below.

TABLE 3

| CPU RAM | Operation of writing to Memory | |
|---|---|---|
| | 64-bit CPU | 32-bit CPU |
| Internal RAM + Expanded RAM (8 MB) | Case 1 (FIG. 14) 64 bits on the processor data bus are outputted as 64 bits on the memory data bus. | Case 2 (FIG. 15) 64 bits on the processor data bus are outputted as 64 bits on the memory data bus. |
| Internal RAM only (4 MB) | Case 3 (FIG. 20) 64 bits on the processor data bus are divided into upper data and lower data, and outputted as upper 32 bits on the memory data bus. | Case 4 (FIG. 21) Upper 32 bits on the processor data bus are outputted as upper 32 bits on the memory data bus. |

In Case 1 (64-bit CPU+Expanded RAM shown in FIG. 14), the processor data bus 306 and the memory data bus 310 are both driven with all 64 bits being effective. Therefore, data on the processor data bus 306 is transferred to the memory data bus 310 as is. At this moment, 64-bit data that is outputted from the CPU 124 is temporarily stored in a write buffer 642, and is passed through a selector 644 and a swap circuit 646 as is.

The write buffer 642 and the selector 644 are circuits that are required during a burst write cycle. During the burst write cycle, data of 64 bits is written in a memory four times. The write buffer 642 includes four 64-bit buffers. During the burst write cycle, the write buffer 642 successively store four sets of 64-bit data in response to four latch signals MLAT0–MLAT3 provided by the timing control section 600 (FIG. 10). It is noted that the four cycles of addresses are periodic. Accordingly, to renew an address at the bus conversion section 200, a clock signal may be inputted to the bus conversion section 200. Clock pulses may be counted by a 2-bit counter and the burst address may be renewed based on the counted value. In this case, a clock up signal for instructing the start of a burst cycle may be provided from the memory controller 202 to the bus conversion section 200.

The selector 644 selects one of the four buffers in response to 2-bit selection signals MSL0, MSL1 provided from the timing control section 600, and provides 64-bit data to the swap circuit 646. In an ordinary write cycle other than a burst write cycle, one of the buffers in the write buffer 642 is used, and the data is merely passed through the selector 644. The swap circuit 646 passes data when all the 64 bits of the processor data bus 306 and the memory data bus 310 are effective.

In Case 2 in Table 3 (32-bit CPU+Expanded RAM shown in FIG. 15), since the lower 32 bits CD0–CD31 of the processor data bus 306 and the upper 32 bits CD32–CD63 are coupled together, the same data is inputted to both of the upper and the lower bits. Therefore, in this case data of 64 bits on the processor data bus 306 can be outputted as the corresponding 64 bits on the memory data bus 310. Row address strobe signals RAS1 and RAS0 are provided to the internal RAM 208 and the expanded RAM 210, respectively, to designate which one of them is used for writing in data. The data writing operation is executed in response to a column address strobe signal CAS and a write enable signal WE (not shown) in addition to the row address strobe signals RAS1 and RAS0. As described above, in Case 2 where the 32-bit CPU 104 and the expanded RAM 210 are installed, 64-bit data is passed through the swap circuit 646.

Where not all bits of the 32-bit data on the processor data bus 306 are effective but a part of bytes is effective, the swap circuit 646 transfers effective bytes on the processor data bus 306 to proper bus lines on the memory data bus 310. Therefore, a circuit that executes data transfer between the processor data bus 306 and the memory data bus 310 in response to the lower address (an 8-bit byte enable signal EB0'-BE7' or an address A2 and a 4-bit enable signal BE0'-BE3'), such as the swap circuit 646, can be used.

In Case 3 shown in Table 3 (64-bit CPU+Internal RAM only as shown in FIG. 20), by the operation of the swap circuit 646, 64-bit data on the processor bus 306 is transferred in two divided sections to the upper 32-bit MD32-MD63 on the memory data bus 310. Since this operation is generally the same as the one described above with reference to FIG. 16 (data transfer cycle from the 64-bit CPU to the input-output data bus), the explanation of the operation is omitted.

In Case 4 (32-bit CPU+Internal ROM only as shown in FIG. 21), data of the upper 32 bits CD32-CD63 on the processor data bus 306 is transferred to the upper 32 bits of the memory data bus 310 as is. This operation is generally the same as the one described above with reference to FIG. 17 (data transfer cycle from the 32-bit CPU to the input-output data bus) except that the address status signal ADS' is changed to ADSM and the burst ready signal BRDY' is changed to BRDYM. Therefore, the description of the operation is omitted.

As described above, when the 32-bit CPU 104 is installed, the same data is outputted as the upper 32 bits and the lower 32 bits of the processor data bus 306. Therefore, 64-bit data is merely passed through the swap circuit 646. This is an advantage derived from the structure in which the upper 32 bits and the lower 32 bits of the processor data bus 306 are coupled together.

As described above, in an ordinary data write cycle from the CPU to the memory, effective bytes on the processor data bus 306 are transferred to appropriate bus lines of the memory data bus 310. It is noted, as shown in FIG. 14, that the different row address strobe signals RAS1 and RAS0 are provided to the internal RAMs 208a, 208b and the expanded RAMs 210a, 210b, respectively, so that effective data are written in the respective RAMs in response to the strobe signals RAS1 and RAS0.

Read operations from the memory to the CPU in the above described four cases are summarized in Table 4 shown below.

TABLE 4

| CPU RAM | Operation of reading from Memory | |
|---|---|---|
| | 64-bit CPU | 32-bit CPU |
| Internal RAM + Expanded RAM (8 MB) | Case 1 (FIG. 14) 64 bits on the memory data bus are outputted as 64 bits on the processor data bus. | Case 2 (FIG. 15) One of upper 32 bits and lower 32 bits on the memory data bus are outputted to the processor data bus. |
| Internal RAM only (4 MB) | Case 3 (FIG. 20) upper 32 bits on the memory data bus are latched in the upper and lower latches, and outputted as 64 bits on the processor data bus. | Case 4 (FIG. 21) Upper 32 bits on the memory data bus are outputted as upper 32 bits on the processor data bus. |

In Case 1 shown in Table 4 (64-bit CPU+Expanded RAM as shown in FIG. 14), the processor data bus 306 and the memory data bus 310 are driven with all the 64 bits being effective. Therefore, data on the memory data bus 310 is transferred to the processor data bus 306 as is. Accordingly, 64-bit data passes through the swap circuit 648, maintained by two latch circuits 650 and 652 in two sections each having 32 bits, and then outputted to the processor data bus 306.

In Case 2 shown in Table 4 (32-bit CPU+Expanded RAM as shown in FIG. 15), 32-bit data read out from the RAMs is outputted as the upper 32 bits or the lower 32 bits of the memory data bus 310. Since the upper 32 bits and the lower 32 bits of the processor data bus 306 are coupled together, the same data is provided to both of the upper and lower bits. Accordingly, the swap circuit 648 allows one of the upper 32 bits and the lower 32 bits on the memory data bus 310 to pass to the processor data bus 306.

As described above, when the 32-bit CPU 104 and the expanded RAM 210 are installed, the swap circuit 648 transfers the effective 32 bits on the memory data bus 310 to the processor data bus 306 as is.

Where not all bits of 32-bit data on the processor data bus 310 are effective, but a part of bytes are effective, the swap circuit 648 transfers effective bytes on the memory data bus 310 to proper bus lines on the processor data bus 306. Therefore, a circuit that executes data transfer between the processor data bus 306 and the memory data bus 310 in response to the lower address (an address A2 and a 4-bit enable signal BE0'-BE3', or an 8-bit byte enable signal EB0'-BE7'), such as the swap circuit 646, can be used.

In Case 3 shown in Table 4 (64-bit CPU+Internal RAM only as shown in FIG. 20), by the operation of the swap circuit 648, data of the upper 32 bits on the memory data bus 310 is allocated to and maintained by the upper side latch circuit 650 and the lower side latch circuit 652. Data of 64 bits maintained by the two latch circuits 650 and 652 are simultaneously outputted to the processor data bus 306. Since this operation is generally the same as the one described above with reference to FIG. 18 (data transfer cycle from the input-output data bus to the 64-bit CPU), the description of the operation is omitted.

In Case 4 shown in Table 4 (32-bit CPU+Internal RAM only as shown in FIG. 21), data of the upper 32 bits on the memory data bus 310 is transferred to the upper 32-bits on the processor data bus 306. Since this operation is generally the same as the one described with reference to FIG. 19 (data transfer cycle from the input-output data bus to the 32-bit CPU), the description of the operation is omitted.

As described above, in an ordinary data write cycle of writing data from the memory to the CPU, effective bytes on the memory data bus 310 are transferred to appropriate bus lines of the processor data bus 306 by the operation of the swap circuit 648 and the latch circuits 650 and 652. It is noted that when the 32-bit CPU 104 is installed, the swap circuit 648 allows one of data of the upper 32 bits and data of the lower 32 bits to pass as is. This is an advantage derived from the structure in which the upper 32 bits and the lower 32 bits of the processor data bus 306 are coupled together.

The memory controller 202 determines which one of the above cases is applicable to a given computer structure in response to the module determination signal det provided from the terminal of the CPU module and the memory determination signal Mdet provided from the terminal of the expanded RAM, and provides an appropriate signal to the bus conversion section 200. Therefore, the memory controller 202 and the bus conversion section 200 can execute an appropriate data transfer in accordance with the data bus width of the CPU and the capacity of the RAM.

H. Operation of Secondary Cache Control Section 614

Figure 22:
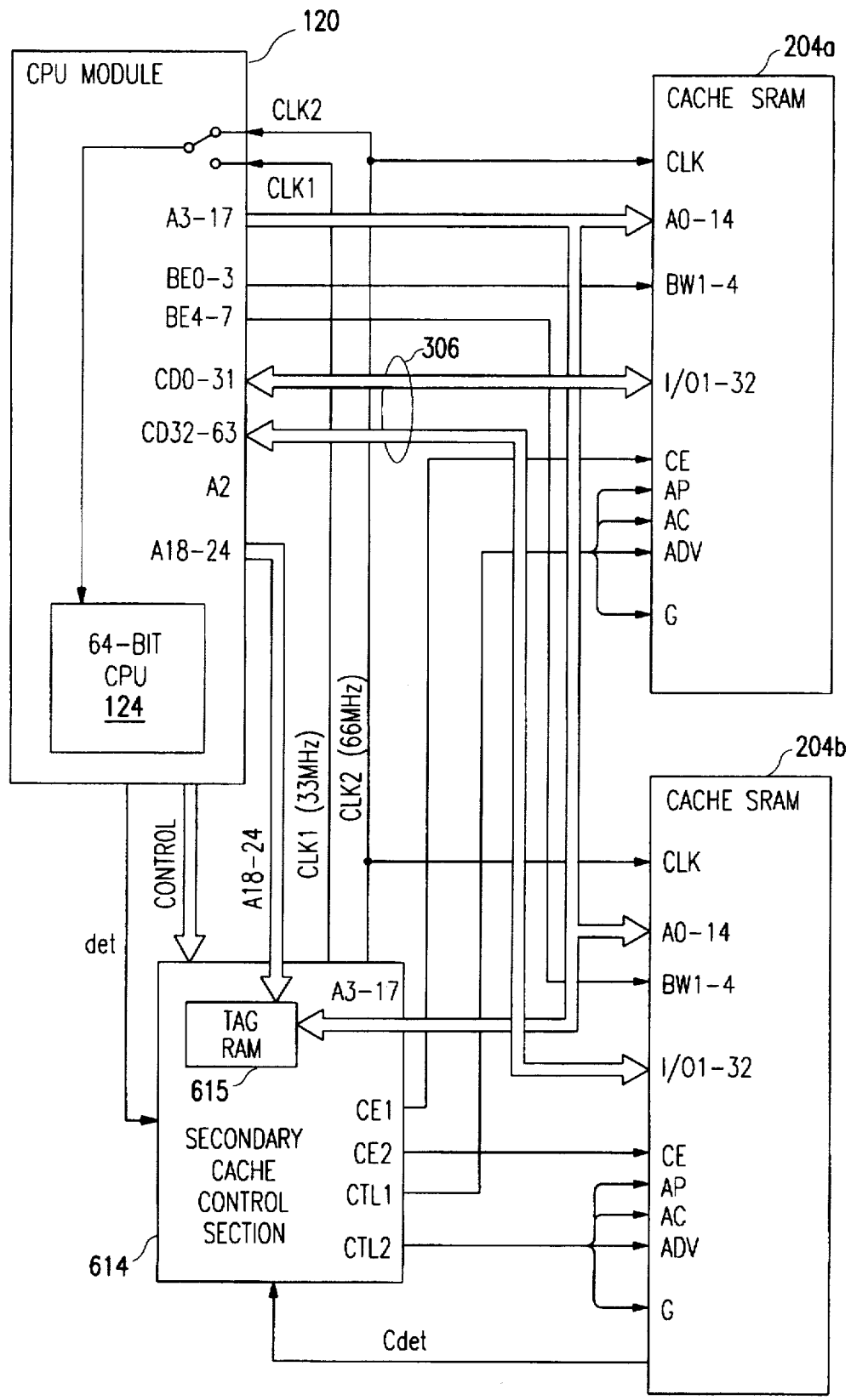
FIG. 22 shows a block diagram illustrating a relation between a second CPU module 120, a secondary cache control section 614 and a secondary cache 204.

FIG. 22 shows a block diagram illustrating the relation between the second CPU module 120, the secondary cache control section 614 and the secondary cache 204.

Figure 23:
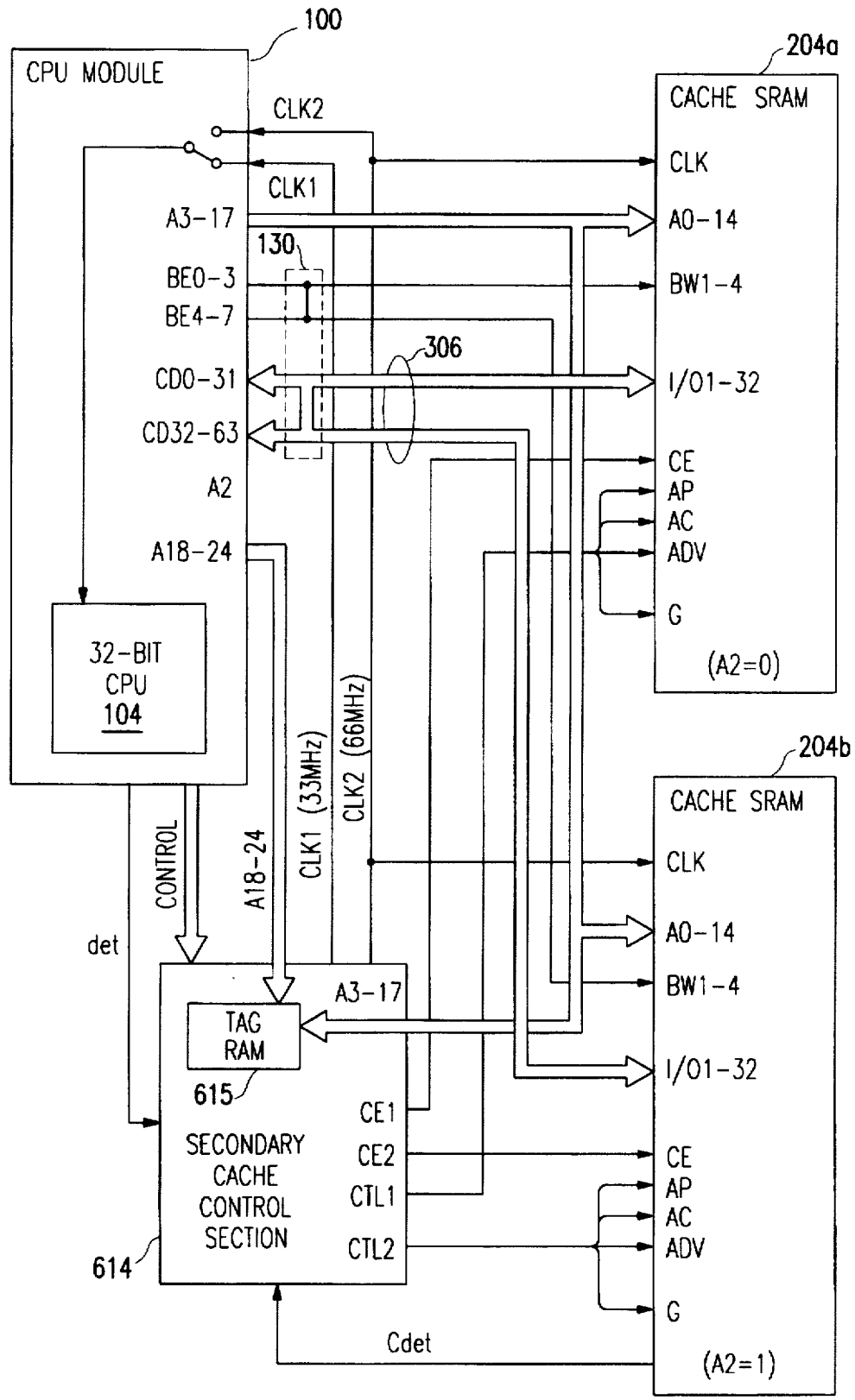
FIG. 23 shows a block diagram illustrating a relation between a first CPU module 100, a secondary cache control section 614 and a secondary cache 204.

FIG. 23 shows a case in which the first CPU module 100 is installed. The secondary cache 204 has two caches SRAM 204a and 204b. SRAMs to be used for the secondary cache are required to be fast and applicable to a burst cycle. Therefore, a synchronous fast SRAM with a burst counter or the like is used. For example, μPD431132L manufactured by Nippon Electric Corporation can be used for this type of SRAM.

Each of the caches SRAM 204a and SRAM 204b has a capacity of 128 kB in a format of 4 bytes/word×32 k words. Each has terminals listed below.

CLK: Clock signal provided from the memory controller.
A0–14: Address input coupled to an address A3–A17 of the CPU.
BW1–4: Byte write (controls writing of 4 bytes in a word).
I/O1–32: Data input-output of 4 bytes (=32 bits).
CE: Chip enable.
AP: Processor address status (used for inputting an address status signal ADS of the CPU).
AC: Controller address status (used for inputting an address status signal provided by the memory controller 202).
ADV: Burst address advance (counts the burst counter in the SRAM).
G: Output enable.

The second cache control section 614 has an upper address of data to be cached, and a TAG-RAM 615 for storing effective bits. Each of the caches SRAM 204a and 204b stores data of 4 bytes per a word. However, when the second CPU module 120 is installed (FIG. 22), the two caches SRAM 204a and 204b are combined to store data of 8 bytes per a word. The address A3–17 of the CPU 124 is commonly inputted to an address A0–A14 of each of the two caches SRAM 204a and 204b. As a result, a word address of each of 32 k words (8 bytes/word) is designated. The lower 4 bits BE0–BE3 of the byte enable signal are inputted to the byte write BW1–4 of the first cache SRAM 204a, and the upper 4 bits BE4–7 of the byte enable signal are inputted to the byte write BW1–BW4 of the second cache SRAM204b. Namely, the first cache SRAM 204a stores the lower 4 bytes of 8-byte (64 bits) data, and the second cache SRAM 204b stores the upper 4 bytes. Therefore, the data input-output terminals I/O1–31 of the first cache SRAM 204a are coupled to the lower 32 bits CD0–31 of the processor data bus 306, and the data input-output terminals I/O1–31 of the second cache SRAM 204b are coupled to the upper 32 bits CD32–63 of the processor data bus 306.

It is noted that the addresses A3–A17 and A18–A24 of the CPU 124 are provided to the TAG-RAM 615. The function of the TAG-RAM 615 will be described later.

The secondary cache control section 614 is also provided with a control signal and a module determination signal det by the CPU module, and a cache determination signal Cdt by the cache module. If the cache determination signal Cdt indicates that the secondary cache 204 is added, the secondary cache control section 614 outputs various signals (CE, AP, etc.) required for the control of the two cache RAMs 204a and 204b in response to various signals provided by the CPU module.

When the first CPU module 100 is installed (FIG. 23), data input-output in a unit of 4 bytes/word is executed to the respective two cache RAMs 204a and 204b. The address A3–17 of the CPU 104 is commonly inputted to the two caches SRAM 204a and 204b. Also, the chip enable signals CE1 and CE2 in accordance with the address A2 are provided by the secondary cache control section 614 to the caches SRAM 204a and 204b, respectively. When the address A2 is at "0", the first cache SRAM 204a is operational. When the address A2 is at "1" , the second cache SRAM 204b is operational. Therefore, word addresses at the caches SRAM 204a and 204b are designated in a unit of 4 bytes/word by the address A2–17.

When the first CPU module is installed by the bus connector board 130, the terminals of the upper 4 bits BE4–7 and the lower 4 bits BE0–3 of the byte enable signal are coupled together, and the terminals of the upper 32 bits CD32–63 and the lower 32 bits CD0–31 of the processor data bus are coupled together. Therefore, the 4-bit byte enable signal BE0–3 of the CPU 104 is commonly provided to the byte write BW1–4 of each of the two caches SRAM 204a and 204b. Also, 32-bit data of the CPU 104 is commonly provided to the data input-output I/O1–31 of each of the two caches SRAM 204a and 204b.

The memory controller 202 is capable of providing a first clock signal CLK1 at 33 MHz and a second clock signal CLK2 at 66 MHz. When the second CPU module 120 is installed (FIG. 22), the second clock signal CLK2 at 66 MHz is inputted to the CPU module 120 and the two caches SRAM 204a and 204b. When the first CPU module 100 is installed (FIG. 23), the first clock signal CLK1 at 33 MHz is inputted to the module 100, and the second clock signal at 66 MHz is inputted to the two caches SRAM 204a and 204b. If the CPU 104 provided in the CPU module 100 uses a clock frequency at 66 MHz, the second clock signal CLK2 may be inputted.

Figure 24:
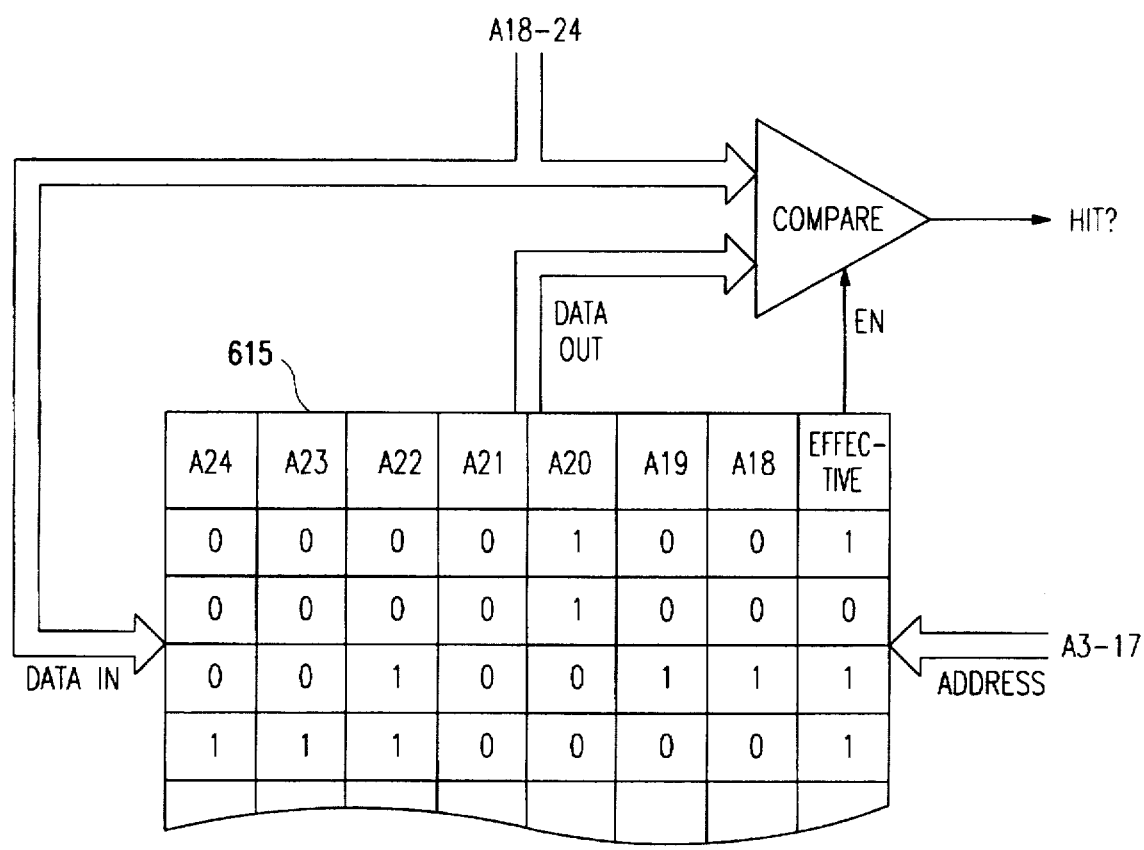
FIG. 24 shows a view used to described the function of a TAG-RAM 615.

FIG. 24 shows a view used to describe the function of the TAG-RAM 615. The TAG-RAM 615 is a RAM that stores the address A18–24 among the address A0–31 of the CPU and an effective bit. The effective bit is set to "1" when effective data is stored in the caches SRAM 204a and 204b, and set to "1" when data is not stored. The address A3–17 outputted from the CPU is inputted to the TAG-RAM 615 as an address (an index). In response to the address A3–17, the upper address A18–24 is outputted. The secondary cache control section 614 compares the upper address A12–24 read out from the TAG-ARM 615 and the address A18–24 provided by the CPU. When they concur with each other, a determination is made that a hit occurs in the cache, and data is read out from the caches SRAM 204a and 204b in response to the address A3–17. It is noted that the TAG-RAM 615 can store only one value in the upper address A18–24 for one value in the address A3–17. Addresses that are subjected to caching, in the entire address space of the CPU are within a range in which values in the upper address A25–31 are all "0". Therefore, each of the caches SRAM 204a and 204b can cache data of 256 kB in the 32 MB address range of 00000000h–01FFFFFFh.

FIG. 25 shows a timing chart of the operation of the secondary cache when the 64-bit CPU 124 is installed. As shown in FIG. 25 (l), the figure shows a single transfer read cycle, a single transfer write cycle, and a 4-time transfer burst read cycle.

In the single transfer read cycle, at clock T1 the address status signal ADS indicating the start of a cycle is outputted from the CPU 124 to the processor address status AP (FIG. 25 (b)) of each of the caches SRAM 204a and 204b, and the address A3–17 (FIG. 25 (*d*)) is also inputted to the caches SRAM 204*a* and 204*b*. When caching is effective, the secondary cache control section 614 brings the chip enable signals CE1 and CE2 at the two caches SRAM 204*a* and 204*b* to fall (FIG. 25 (*g*)), and allows data to be read out by bringing down the output enable signals G1 and G2 (FIG. 25 (*h*)) to "L" level (FIG. 25 (*j*)) at clock T2. When reading out of 8-byte data is completed, the burst ready signal BRDY is provided from the memory controller 202 to the CPU 124 to complete the cycle.

In the single transfer write cycle, the byte write signal BW1–4 assumes "L" level, instead of the output enable signals G1 and G2 (FIG. 25 (*h*)), to allow data to be written in (FIG. 25 (*i*)). As understood from FIG. 22, the lower 4 bits BE0–3 of the byte enable signal are provided to the byte write terminals BW1–4 of the first cache SRAM 204*a*, and the upper 4 bits BE4–7 of the byte enable signal are provided to the byte write terminals BW1–4 of the second cache SRAM 204*b*. When data is written in the secondary caches, because 8 bytes are simultaneously stored, values BE0–7 of the byte enable signal are all at "0".

In the 4-time transfer burst read cycle, at clock T2-1, the secondary cache control section 614 brings the burst address advance ADV (FIG. 25 (*e*)) down to "L" level. In response, each of the two caches SRAM 204*a* and 204*b* starts counting up the internal burst counter. As a result, at each of four consecutive clocks T2-1–T2-4, data of 8 bytes is successively read out.

FIG. 26 shows a timing chart of the operation of the secondary caches when the 32-bit CPU 104 is installed. When the CPU module 100 shown in FIG. 1 is installed, the CPU 104 operates in synchronism with the first clock signal CLK1 at 33 MHz (FIG. 26 (*b*)), the operation shown in FIG. 26 requires an operation time twice as long as the operation shown in FIG. 26.

The operation In the single transfer read cycle shown in FIG. 26 is generally the same as the operation shown in FIG. 25. However, the following signals are provided independently to the caches SRAM 204*a* and 204*b*.

Controller address status signals AC1, AC2 (FIGS. 26 (*d*), (*e*)): When an address signal ADS is not inputted from the CPU, the secondary cache control section 614 instructs the start of the operation.

Chip enable signals CE1 and CE2 (FIGS. 26 (*j*), (*m*)): The two caches SRAM 204*a* and 204*b* are independently made operable.

Output enable signals G1 and G2 (FIGS. 26 (*l*), (*m*)): The two caches SRAM 204*a* and 204*b* are independently made readable.

In the single transfer read cycle shown in FIG. 26, the value of the address A2 (FIG. 26 (*g*)) is "0", and data is read from the first cache SRAM 204*a*. Accordingly, the secondary cache control section 614 brings down each of the first chip enable signal CE1 (FIG. 26 (*j*)) and the first output enable signal G1 (FIG. 26, (*m*)) to "L" level, and reads out 4-byte (32 bits) data from the first cache SRAM 204*a* (FIG. 26, (*o*)).

On the other hand, the single transfer write cycle shown in FIG. 26, the value of the address A2 (FIG. 26 (*g*)) is "1", and data is written in the second cache SRAM 204*b*. Accordingly, the secondary cache control section 614 brings down each of the second chip enable signal CE2 (FIG. 26 (*k*)) and the byte write signal BW1–4 to "L" level, and writes 4-byte (32 bits) data in the second cache SRAM 204*b*.

In the 4-time transfer burst read cycle shown in FIG. 26, at clock T2-1–T24, 4-byte data is alternately read from the two caches SRAM 204*a* and 204*b*. First, since the value of the address A1 (FIG. 26 (*g*)) that is provided at the beginning is "0", the first chip enable signal CE1 (FIG. 26 (*j*)) and the first output enable signal G1 (FIG. 26 (*l*)) assume "L" level, and 4-byte data Q1 is read out from the first cache SRAM 204*a* at clock T2-1 (FIG. 26 (*o*)). The value of each of the addresses A3 and A2 at this moment is "0". At clock T2-2, the secondary cache control section 614 brings down the controller address status signal AC2 (FIG. 26 (*e*)) that is provided to the second cache SRAM 204*a* to "L" level to start the operation of the second cache SRAM 204*b*. Namely, the second chip enable signal CE2 (FIG. 26 (*k*)) and the second output enable signal G2 (FIG. 26 (*m*)) are lowered to "L" level, and in response, 4-byte data Q2 is read out from the second cache SRAM 204*b*. It is noted that since the second cache SRAM 204*b* stores data in which the address A2 is "1", 4-byte data in which the addresses A3 and A2 are respectively "0" and "1" is read out at clock T2-2, as shown in FIG. 26 (*h*).

At clock T2-3, the secondary cache control section 614 brings down the burst address advance signal ADV (FIG. 26 (*h*)) to "L" level, and allows the burst counters in the two caches SRAM 204*a* and 204*b* to count up. As a result, the address A3 is changed to "1". At clock T2-3, the secondary cache control section 614 brings down the first output enable signal G1 (FIG. 26 (*l*)) to "L" level, and in response thereto, reads out 4-byte data Q3 (FIG. 26 (*o*)) from the first cache SRAM 204*a*. It is noted that the addressees A3 and A2 are at "1" and "0", respectively, as shown in FIG. 26 (*h*). At clock T2-4, the secondary cache control section 614 brings down the second output enable signal G2 (FIG. 7 (*m*)) to "L" level, and reads out 4-byte data Q4 (FIG. 26 (*o*)) from the second cache SRAM 204*b*. The value of each of the addresses A3 and A2 is "1" as shown in FIG. 26 (*h*). When the 4-time transfer is completed, the memory controller 202 raises the burst ready signal BRDY to "H" level, to notifies to the CPU 104 that the burst transfer cycle is completed.

As described above, when the 32-bit CPU 104 is installed, data each having 4 bytes is read out from the two caches SRAM 204*a* and 204*b* alternately to perform the 4-time transfer burst read cycle.

As understood by comparing FIG. 22 and FIG. 23, the connection between the secondary cache control section 614 and the two caches SRAM 204*a* and 204*b* remains to be the same no matter which one of the first CPU module and the second CPU module is installed. A major difference between the embodiments shown in FIG. 22 and FIG. 23 is that, in the embodiment shown in FIG. 23, the upper 32 bits D32–63 and the lower 32 bits D0–31 of the processor data bus 306, and the upper 4 bits BE4–7 and the lower 4 bits BE0–3 of the byte enable signal are coupled together by the bus connector board 130. As a result, the secondary cache control section 614 can select one of the two caches SRAM 204*a* and 204*b* and execute the data input-output operation. Whether a 64-bit CPU is installed or a 32-bit CPU is installed can be indicated by the module determination signal det. As a result, the secondary cache control section 614 can perform the control (FIG. 25 and FIG. 26) that is appropriate to an installed CPU.

In accordance with the embodiments described above, a CPU and a CPU module having connectors are replaced. As a result, CPUs having different bus widths are readily interchangeable. This type of module has various advantages over modules equipped with a power source for a particular CPU and a bus conversion circuit, such as for example, a simpler structure, reduced volume and surface area, and reduced cost. In particular, in a mobile type information processing apparatus called a notebook size personal computer, a replacement module for a CPU cannot have a large volume or a large surface area. However, the present invention is advantageous in this respect because a small module having a CPU can be replaced. Moreover, there is an advantage in that it is easier to replace a smaller module.

The bus conversion section 200 shown in FIG. 9 executes a bus conversion that is appropriate to the bus width of the installed CPU. As a result, a CPU having a different bus width can be replaced without lowering the processing power of the CPU. In this case, the bus conversion section 200 that is appropriate to the CPU is not required to be installed within the module.

Furthermore, where a CPU and connectors are formed in a module, a small package, such as a TCP (tape carrier package), a QFP (quad-flat package) and the like, can be used. As a result, the module can be made smaller.

Also, as shown in FIG. 4, when the first CPU module 100 is installed, the bus connector board 130 may be coupled to the connector 116 for a 64-bit CPU. As a result, the second CPU module cannot be installed unless the bus connector board 130 is removed. Therefore, by the use of the bus connector board 130, the signal change for a specific CPU module can be securely performed at a low cost.

It should be noted that the present invention is not limited to the embodiments described above, and can be implemented in various embodiments as long as such embodiments do not deviate from the scope of the subject matter. For example, the following modifications are possible.

(1) The present invention is applicable to a data bus width other than the 32-bit bus width and the 64-bit bus width for the first CPU 104 and the second CPU 124.

(2) In the embodiments described above, terminals for generating the determination signals det, Mdet and Cdet are provided at the connectors of each module. However, circuits for generating various determination signals may be provided at places other than the connectors. However, there are advantages in providing determination terminals at the connector because determination signals appropriate to the installed module are generated without an error.

As described above, in accordance with the above described embodiments, one of a first CPU module and a second CPU module having different data bus widths can be selected and installed. The process of transferring data on a processor data bus to other circuits can be readily performed within a data processing apparatus that is equipped with a first CPU module. A first group of terminals and a second group of corresponding terminals may be readily coupled. The process of transferring data on a processor data bus to other circuits can be more readily performed within a data processing apparatus that is equipped with a first CPU module. A second CPU module can be readily installed. First and second external cache circuits are effectively utilized no matter which CPU module is installed. Also, an operation appropriate to an installed CPU module is performed in response to the connection status of connectors.

What is claimed is:

1. A data processing apparatus in which a first CPU module having a first data bus of a first bus width is replaceable with a second CPU module having a second data bus of a second bus width that is twice that of the first bus width, the data processing apparatus comprising:

a processor data bus including a first bus section and a second bus section, the first bus section and the second bus section each having a bus width equal to the first bus width;

a first group of terminals coupled to the first bus section of the processor data bus, the first group of terminals being capable of being coupled to the first data bus when the first CPU module is installed; and a second group of terminals coupled to the second bus section of the processor data bus, the second group of terminals including terminals capable of being coupled to the first group of terminals when the first CPU module is installed, and capable of being coupled to the second data bus together with the first group of terminals when the second CPU module is installed, wherein the first CPU module having the first data bus being removably coupled to the first group of terminals, and includes a removable bus coupling device for connecting corresponding terminals of the first group of terminals and the second group of terminals, wherein the corresponding terminals of the first group of terminals and the second group of terminals are disposed opposing each other, and the bus coupling device includes a plurality of conductor sections for coupling the opposed corresponding terminals of the first group of terminals and the second group of terminals.

2. The data processing apparatus of claim 1, the data processing apparatus further comprising:

a first group of byte enable terminals for transferring a first byte enable signal that indicates which bytes on the first bus section of the processor data bus are enabled; and a second group of byte enable terminals for transferring a second byte enable signal that indicates which bytes on the second bus section of the processor data bus are enabled, wherein the bus connector device includes a device for coupling corresponding terminals of the first group of byte enable terminals and the second group of byte enable terminals.

3. A data processing apparatus in which a first CPU module having a first data bus of a first bus width is replaceable with a second CPU module having a second data bus of a second bus width that is twice that of the first bus width, the data processing apparatus comprising:

a processor data bus including a first bus section and a second bus section, the first bus section and the second bus section each having a bus width equal to the first bus width;

a first group of terminals coupled to the first bus section of the processor data bus, the first group of terminals being capable of being coupled to the first data bus when the first CPU module is installed;

a second group of terminals coupled to the second bus section of the processor data bus, the second group of terminals including terminals capable of being coupled to the first group of terminals when the first CPU module is installed, and capable of being coupled to the second data bus together with the first group of terminals when the second CPU module is installed;

a first external cache circuit coupled to the first bus section of the processor data bus;

a second external cache circuit coupled to the second bus section of the processor data bus;

a module determination signal generation device for generating a module determination signal that indicates which one of the first CPU module and the second CPU module is installed; and an external cache control device responsive to the module determination signal for supplying to the first and the second external caches a signal for executing a cache operation that is appropriate to an installed CPU module.

4. A data processing apparatus as defined in claim 3, wherein the module determination signal generation device has a module determination terminal that changes a level of the module determination signal in response to the state of coupling of a connector including the second group of terminals.

5. The data processing apparatus of claim 3, wherein the external cache control device includes a device responsive to an address provided by the installed CPU that selects one of the first external cache circuit and the second external cache circuit and generates a signal for executing a data input-output operation when the first CPU module is installed, and that selects both the first external cache circuit and the second external cache circuit and generates a signal for executing a data input-output operation when the second CPU module is installed.

6. The data processing apparatus of claim 5, wherein the module determination signal generation device has a module determination terminal that changes a level of the module determination signal in response to the state of connection of a connector including the second group of terminals.

7. A method of making a data processing apparatus in which a first CPU module having a first data bus of a first bus width is replaceable with a second CPU module having a second data bus of a second bus width that is twice as wide as the first bus width, the method comprising the steps of:

(a) providing a processor data bus including a first bus section and a second bus section, the first bus section and the second bus section each having a bus width equal to the first bus width, a first group of terminals coupled to the first bus section of the processor data bus, and a second group of terminals coupled to the second bus section of the processor data bus;

(b) installing a CPU including one of steps of removably coupling the first group of terminals to the first data bus when the first CPU module is installed, and removably coupling the first group of terminals and the second group of terminals to the second data bus when the second CPU module is installed; and (c) coupling corresponding terminals of the first group of terminals and the second group of terminals when the first CPU module is installed, wherein the step (a) further includes the steps of providing a first external cache circuit coupled to the first bus section of the processor data bus, providing a second external cache circuit coupled to the second bus section of the processor data bus, and providing a module determination signal generation device for generating a module determination signal that indicates which one of the first CPU module and the second CPU module is installed, and wherein the method further comprises a step (d) of enabling a cache operation that is compatible with an installed CPU module in response to the module determination signal.

* * * * *